US008462681B2

(12) United States Patent
Pochiraju et al.

(10) Patent No.: US 8,462,681 B2
(45) Date of Patent: Jun. 11, 2013

(54) METHOD AND APPARATUS FOR ADAPTIVE TRANSMISSION OF SENSOR DATA WITH LATENCY CONTROLS

(75) Inventors: Kishore Pochiraju, Princeton Junction, NJ (US); Biruk Gebre, Weehawken, NJ (US); Hao Men, Harrison, NJ (US)

(73) Assignee: The Trustees of Stevens Institute of Technology, Hoboken, NJ (US)

( * ) Notice: Subject to any disclaimer, the term of this patent is extended or adjusted under 35 U.S.C. 154(b) by 768 days.

(21) Appl. No.: 12/686,860

(22) Filed: Jan. 13, 2010

(65) Prior Publication Data

US 2010/0278086 A1 Nov. 4, 2010

Related U.S. Application Data

(60) Provisional application No. 61/144,891, filed on Jan. 15, 2009, provisional application No. 61/206,040, filed on Jan. 23, 2009, provisional application No. 61/147,413, filed on Jan. 26, 2009.

(51) Int. Cl.
*H04B 7/00* (2006.01)

(52) U.S. Cl.
USPC .......................................... 370/310; 370/465

(58) Field of Classification Search
USPC ...... 370/230, 230.1, 231–235, 310, 342–343, 370/345, 389, 392, 400, 428–429, 441–442, 370/478–480; 709/201–203, 219, 231–234
See application file for complete search history.

(56) References Cited

U.S. PATENT DOCUMENTS

| | | | |
|---|---|---|---|
| 4,330,689 A | 5/1982 | Kang et al. | |
| 5,933,808 A | 8/1999 | Kang et al. | |
| 6,141,329 A | 10/2000 | Turner | |
| 6,208,247 B1 | 3/2001 | Agre et al. | |
| 6,414,955 B1 | 7/2002 | Clare et al. | |
| 6,480,491 B1 | 11/2002 | Miao | |
| 6,496,794 B1 | 12/2002 | Kleider et al. | |
| 6,678,244 B1 | 1/2004 | Appanna et al. | |
| 6,691,084 B2 | 2/2004 | Manjunath et al. | |
| 7,046,166 B2 | 5/2006 | Pedyash et al. | |
| 7,051,259 B1 | 5/2006 | Williams, Jr. et al. | |

(Continued)

OTHER PUBLICATIONS

Gebre et al.; "Real-Time Virtual Instruments for Remote Sensor Monitoring Using Low Bandwith Wireless Networks"; Journa of System cs, Cybernet cs and nformat cs, vol. 6, No. 3, Mar. 2008, pp. 7-17.*

(Continued)

*Primary Examiner* — Kevin Mew
(74) *Attorney, Agent, or Firm* — Greenberg Traurig, LLP

(57) ABSTRACT

Disclosed is a method and apparatus to continuously transmit high bandwidth, real-time data, on a communications network (e.g., wired, wireless, and a combination of wired and wireless segments). A control computing device uses user or application requirements to dynamically adjust the throughput of the system to match the bandwidth of the communications network being used, so that data latency is minimized. An operator can visualize the instantaneous characteristic of the link and, if necessary, make a tradeoff between the latency and resolution of the data to help maintain the real-time nature of the system and better utilize the available network resources. Automated control strategies have also been implemented into the system to enable dynamic adjustments of the system throughput to minimize latency while maximizing data resolution. Several applications have been cited in which latency minimization techniques can be employed for enhanced dynamic performance.

20 Claims, 16 Drawing Sheets

U.S. PATENT DOCUMENTS

| | | | |
|---|---|---|---|
| 7,058,706 | B1 | 6/2006 | Iyer et al. |
| 7,269,139 | B1 | 9/2007 | Williams, Jr. et al. |
| 7,636,340 | B2 * | 12/2009 | Black et al. ............... 370/338 |
| 7,860,994 | B2 * | 12/2010 | Rensin et al. ............... 709/231 |
| 7,877,502 | B2 * | 1/2011 | Rensin et al. ............... 709/231 |
| 7,949,730 | B2 * | 5/2011 | Rensin et al. ............... 709/219 |
| 8,050,206 | B2 * | 11/2011 | Siann et al. ............... 370/310 |
| 2003/0021285 | A1 | 1/2003 | Denninghoff |
| 2003/0185154 | A1 | 10/2003 | Mullendore et al. |
| 2004/0024851 | A1 * | 2/2004 | Naidoo et al. ............... 709/219 |
| 2006/0136575 | A1 * | 6/2006 | Payne et al. ............... 709/219 |
| 2007/0276928 | A1 * | 11/2007 | Rhoads et al. ............... 709/219 |
| 2012/0173755 | A1 * | 7/2012 | Margulis ............... 709/231 |

OTHER PUBLICATIONS

Girod et al.; "Advances in Channel-Adaptive Video Streaming", Proc. IEEE Intern. Conf. Image Processing ICIP 2002, Rochester, NY, Sep. 2002, 4 pgs.

Khansari et al.; "Low Bit-Rate Video Transmission over Fading Channels for Wireless Microcellular Systems"; IEEE Transactions on Circuits and Systems for Video Technology, vol. 6, No. 1, Feb. 1996, pp. 1-11.

Tan et al.; "Real-Time Internet Video Using Error Resilient Scalable Compression and TCP-Friendly Transport Protocol"; IEEE Transactions on Multimedia, vol. 1, No. 2, Jun. 1999, pp. 172-186.

Heide et al.; "Speech Enhancement for Bandlimited Speech"; Naval Research Lab Code 5555, Washington DC, Downloaded on Jan. 6, 2010 from IEEE Xplore, pp. 393-396.

Crow et al.; "IEEE 802.11 Wireless Local Area Networks"; IEEE Communications Magazine, Sep. 1997, pp. 116-126.

Zander; "Radio Resource Management in Future Wireless Networks: Requirements and Limitations"; IEEE Communications Magazine, Aug. 1997, pp. 30-36.

Holland, et al.; "Analysis of TCP Performance over Mobile Ad Hock Networks"; Wireless Networks 8, 2002, pp. 275-288.

Li et al.; "Capacity of Ad Hoc Wireless Networks"; M.I.T. Laboratory for Computer Science; ACM Sigmobile Jul. 2001; Rome, Italy, pp. 61-69.

Varshney et al.; "Emerging Mobile and Wireless Networks"; Communications of the ACM, Jun. 2000, vol. 43, No. 6, pp. 73-81.

Tian et al.; "TCP in Wireless Environments: Problems and Solutions"; IEEE Radio Communications, Mar. 2005, pp. S27-S32.

Jerri; "The Shannon Sampling Theorem—Its Various Extensions and Applications: A Tutorial Review"; Proceedings of the IEEE, vol. 65, No. 11, Nov. 1977, pp. 1565-1596.

He et al.; "Robust and timely communication over highly dynamic sensor networks"; Real-Time Syst (2007) 37:, pp. 261-289.

Sivaradje et al.; "Efficient Resource Allocation Scheme for Real-Time MPEG Video Traffic over ATM Networks"; IEEE International Conference on Communications Systems, 2002, pp. 747-751.

Kim et al.; "Bandwidth Allocation in Wireless Networks with Guaranteed Packet-Loss Performance"; IEEE/ACM Transactions on Networking, vol. 8, No. 3, Jun. 2000, pp. 337-349.

Fu et al.; "How Bad TCP Can Perform in Mobile Ad Hoc Networks"; Proceedings of the Seventh International Symposium on Computers and Communications, 2002, pp. 1-6.

S Series Multifunction DAQ—up to 16-Bit, up to 3 MS/s per Channel, up to 8 Analog Inputs; 7 pgs.

Gebre et al.; "Real-Time Virtual Instruments for Remote Sensor Monitoring Using Low Bandwith Wireless Networks"; Journal of Systemics, Cybernetics and Informatics, vol. 6, No. 3, Mar. 2008, pp. 7-17.

* cited by examiner

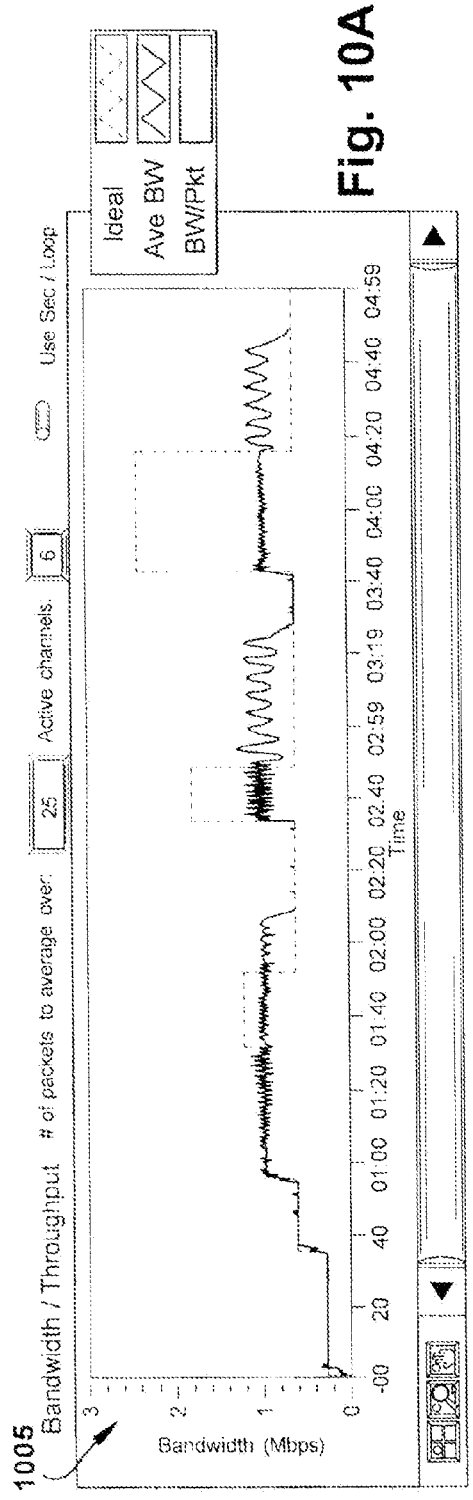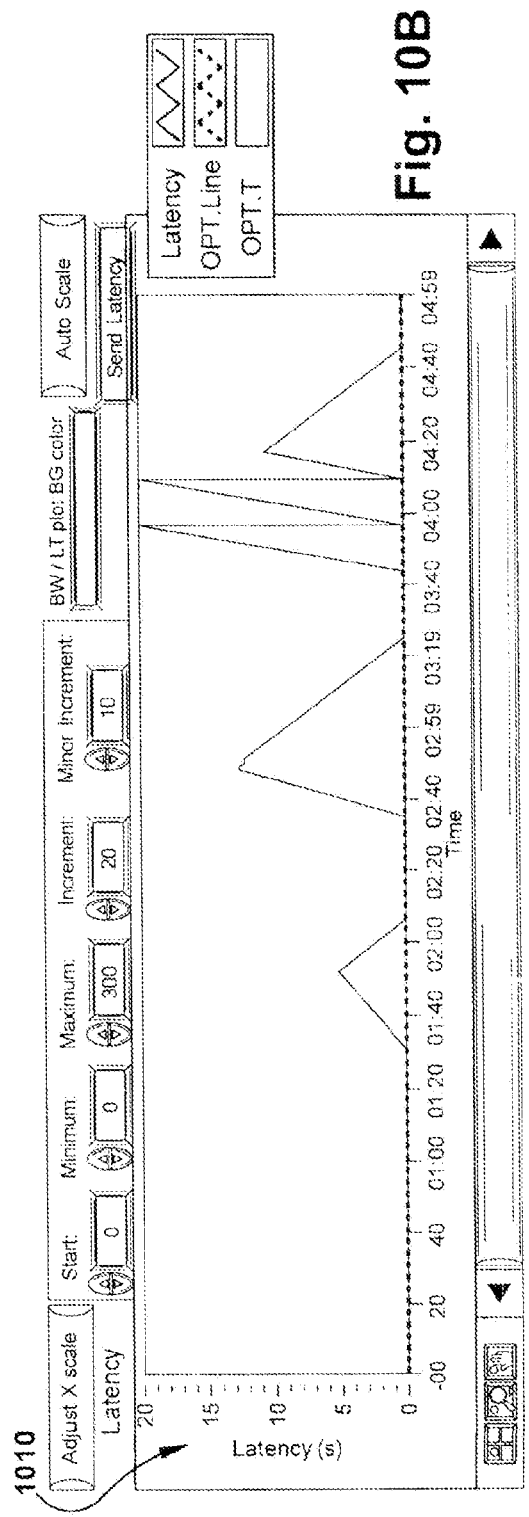
Fig. 10A
Fig. 10B

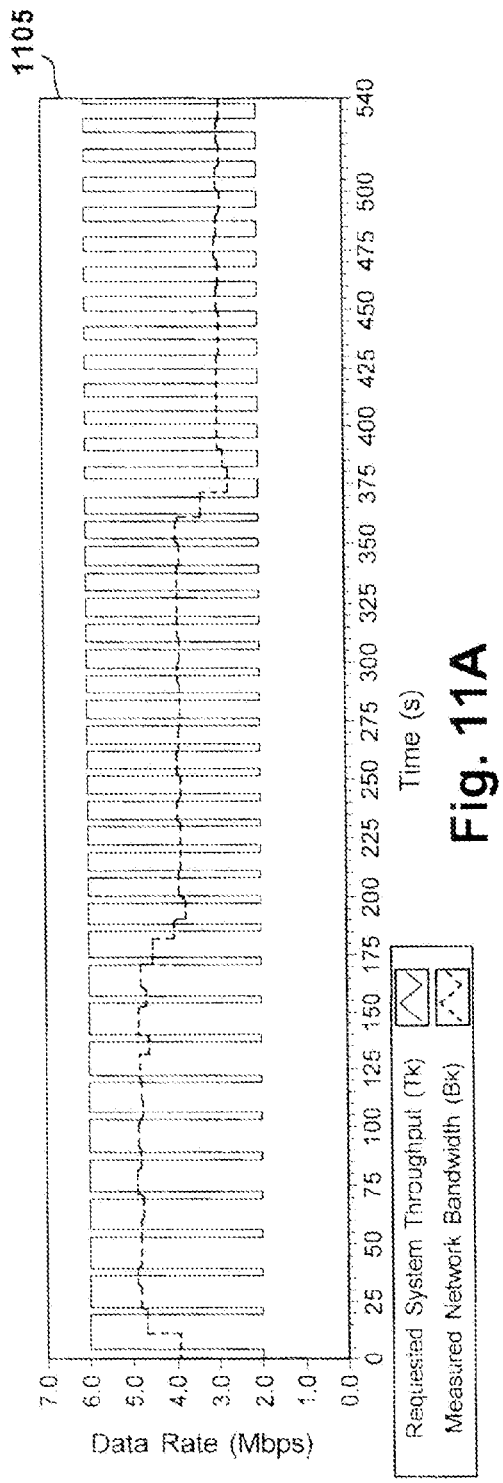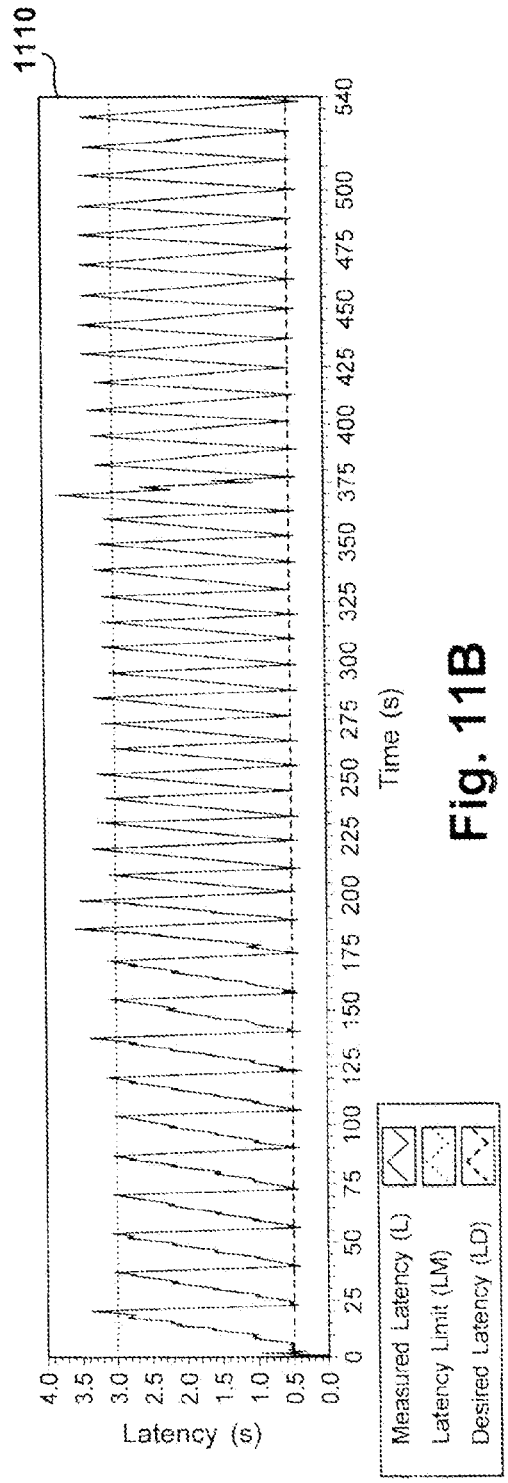
Fig. 11A
Fig. 11B

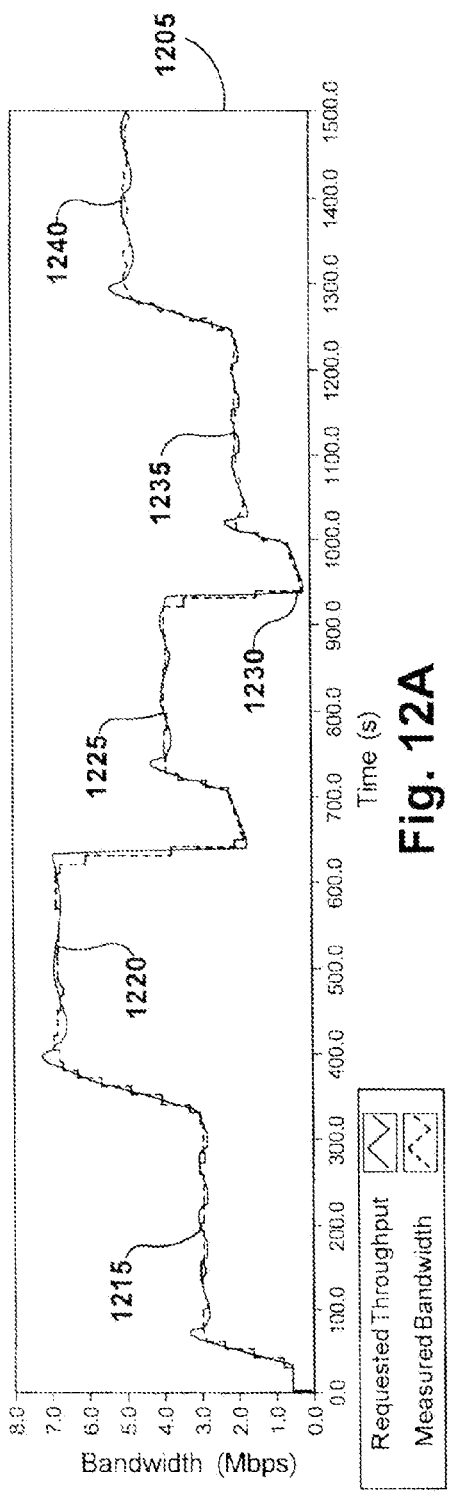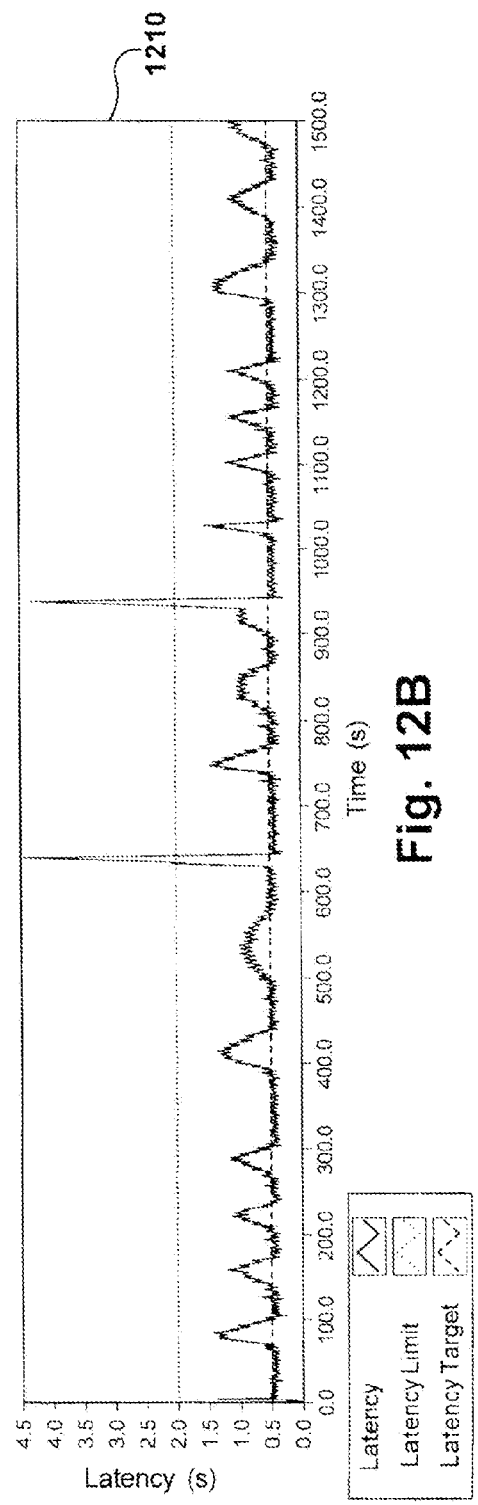

METHOD AND APPARATUS FOR ADAPTIVE TRANSMISSION OF SENSOR DATA WITH LATENCY CONTROLS

RELATED APPLICATIONS

This application claims the benefit of U.S. Provisional Application Ser. No. 61/144,891, filed Jan. 15, 2009; U.S. Provisional Application Ser. No. 61/206,040, filed Jan. 23, 2009; and U.S. Provisional Application Ser. No. 61/147,413, filed Jan. 26, 2009, all of which are incorporated herein by reference in their entirety.

STATEMENT REGARDING FEDERALLY SPONSORED RESEARCH

Development of the subject matter disclosed herein was supported in part by US ARMY/ARDEC Grant No. W15QKN-05-D-0011 Task 31. The U.S. government may have certain rights in this application.

FIELD OF THE INVENTION

The disclosed subject matter relates to the field of sensor data acquisition, remotely operated robots, industrial machinery, sensor data processing and communications for remote system monitoring and control.

BACKGROUND OF THE INVENTION

Wide area communication networks, which contain both wired and wireless networks, are an attractive method of data transmission over long distances for remote sensor data acquisition, processing and control applications. When used in such communication systems, wireless networks have obvious advantages of eliminating the need for costly wired network infrastructures and being more convenient. Wireless networks also enable data transmission from harsh environments and locations, which may be difficult or impossible to access by wired networks and offer much greater freedom in terms of mobility and area coverage.

For all their advantages, however, wide area communication networks with wireless network segments typically have a few major limitations. One typical limitation of wireless networks is their limited and highly variable link bandwidth. Other limitations of wireless networks include their susceptibility to bandwidth losses due to various kinds of interference, their reduction in throughput performance due to attenuation of radio signals with distance and performance degradation due to attenuating objects in the signal path. Additionally, the user of the ubiquitous Transmission Control Protocol (TCP), which is not optimized for use in wireless networks, is another factor that can reduce the available bandwidth of wireless networks. Wide area communication networks with shared network segments can also have variable link bandwidth depending on the network traffic.

While these limitations may not be of concern for applications with low bandwidth requirements and tolerance to high data latencies, it is often a problem for real-time applications. In many real-time applications, the usefulness of the data decays rapidly with time. Therefore, the latency in the communication network must be managed to avoid stale data. For networks with constrained and variable network bandwidth, the data latency and the required data rate (required throughput) are interrelated. Therefore, neither desired throughput nor latency can be guaranteed.

SUMMARY OF THE DISCLOSURE

A method and apparatus to continuously transmit high bandwidth, real-time data, on a communications network is described. The described system enables a control computing device to dynamically adjust the throughput from a remote computing device to match the bandwidth of the communications network being used, so that data latency is minimized and the available network bandwidth is fully utilized. The system allows for the visualization of the instantaneous characteristics of the link and, if necessary, makes a tradeoff between the latency and resolution (throughput) of the data to help maintain the real-time nature of the system. Automated control strategies are implemented into the system to enable dynamic adjustments of the system throughput to minimize latency while maximizing data resolution.

In one aspect, a remote computing device acquires raw data from a plurality of sensors. The resolution of the raw sensor data is adaptively adjusted before the sensor data is transmitted over the communications network to the control computing device. In one embodiment, the remote computing device saves the raw sensor data. In one embodiment, the remote computing device receives control commands from the control computing device. The control commands are associated with the resolution of the sensor data and the bandwidth of the wireless network. In one embodiment, the resolution is adjusted based on the control commands.

In one embodiment, data streams received from a plurality of sensors are merged into a single network sensor data stream by the remote computing device. In one embodiment, the resolution of each sensor data stream can be adjusted individually. In one embodiment, the data from each individual sensor is further split into segments before transmitting data to the control computing device. In one embodiment, the resolution of each individual segment from any sensor data stream is controlled.

In one embodiment, the control computing device receives the network sensor data stream from the remote computing device over the communications network. In one embodiment, the control computing device processes and displays the sensor data. In one embodiment, the control computing device dynamically measures the network throughput and the data latency. In one embodiment, the control computing device displays the network characteristics in real-time. In one embodiment, the control computing device determines the appropriate sensor data resolution for each stream and segments using a plurality of control algorithms and policies such that the latency objectives are met. In one embodiment, the control computing device sends control commands to the remote computing device. In one embodiment, the resolution of the network sensor data stream is adjusted based on the control commands by the remote computing device.

In one embodiment, adjusting of the resolution of the sensor data comprises reducing the resolution using a mean reduction technique, a maximum reduction technique, and/or a minimum reduction technique. In one embodiment, the adjusting of the resolution of the sensor data includes varying the resolution of the sensor data to an application acceptable minimum. In one embodiment, the resolution adjustment is content sensitive.

These and other aspects and embodiments will be apparent to those of ordinary skill in the art by reference to the following detailed description and the accompanying drawings.

BRIEF DESCRIPTION OF THE FIGURES

For a better understanding of the present invention, reference is made to the following detailed description of exemplary embodiments considered in conjunction with the accompanying drawings, in which:

FIGS. 10A and 10B illustrate graphical representations of data statistics displayed by the control computing device in accordance with an embodiment of the present disclosure;

FIGS. 11A and 11B illustrate graphical representations of a response of the system of FIG. 1 using a limit control strategy in accordance with an embodiment of the present disclosure;

FIGS. 12A and 12B illustrate graphical representations of a controlled wired bandwidth test of the system of FIG. 1 in accordance with an embodiment of the present disclosure;

DETAILED DESCRIPTION OF THE DISCLOSURE

Figure 1:
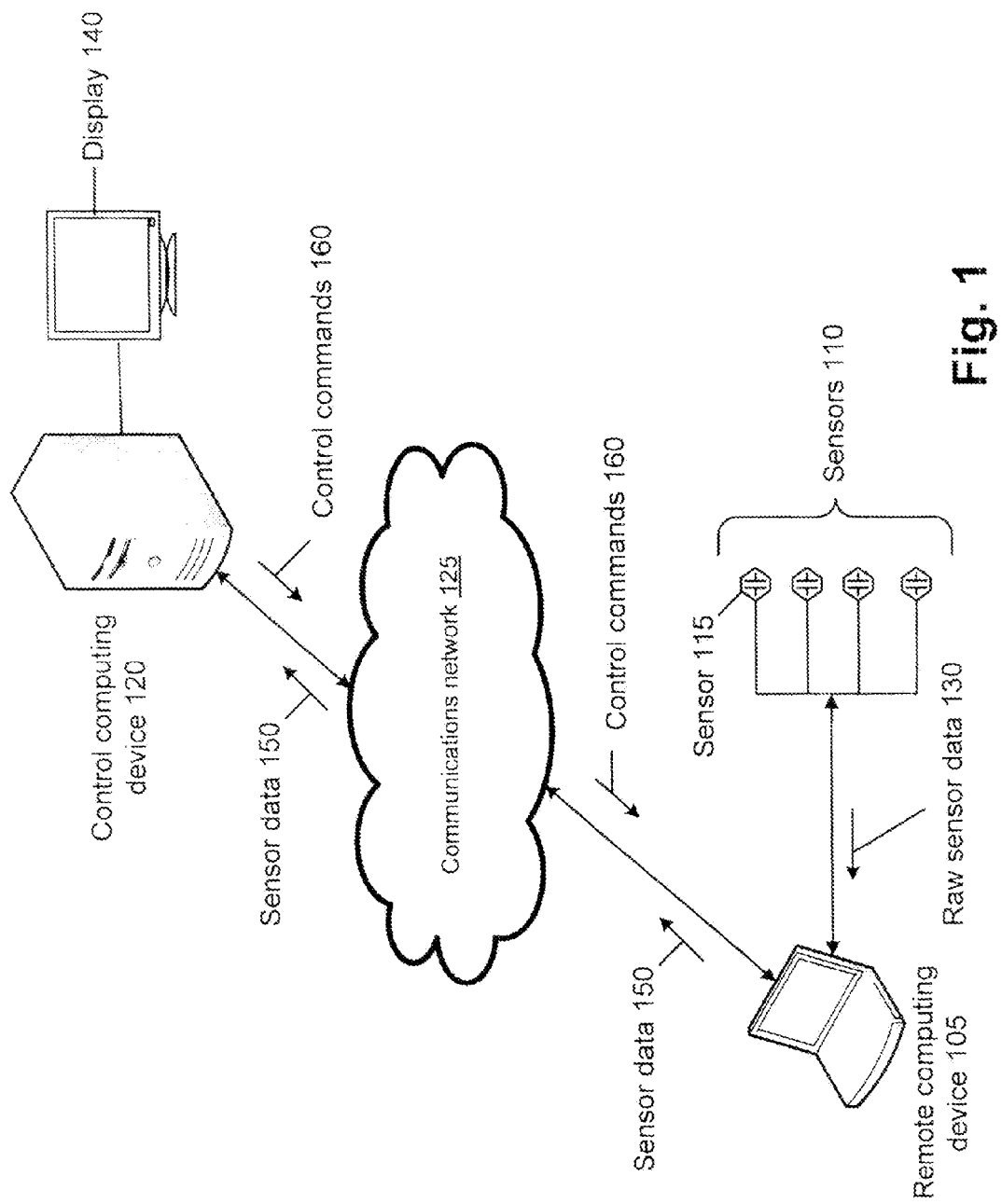
FIG. 1 is a block diagram of a remote computing device connected to sensors and communicating with a control computing device over a communications network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The technology disclosed herein presents a new method and related apparatus for controlled transmission of sensor data over a communications network when a limit on the end point-to-end point latency is desired. Latency refers to the time elapsed (delay) from the moment of data generation by the sensor to the time at which that data is available to a monitor or controller remotely located from the sensor.

The communications network performance is measured and the sensor data resolution is adaptively controlled to achieve or improve over a specified latency objective in real time. This method is sensitive to the nature of data (content) being transmitted, allows sub-dividing or splitting the data streams into segments, and controls resolution on each individual segment. The method also resolves the competition for the available network bandwidth by varying the resolution of the sensor data to an acceptable minimum for the application and allocating available bandwidth accordingly. The apparatus may comprise hardware ports for connecting multiple types of sensors, actuators and switches; and includes a processor device with embedded software implementing the method.

In general, this method and device are applicable in cases where there is a time value for the acquired sensor data. In such cases, transmission of sensor data to monitoring and control equipment with minimal latency is critical. Examples of suitable applications include:

Machine condition monitoring and fault-detection: The disclosure can be utilized in condition monitoring and fault detection systems for machinery operating in remote, inaccessible and hazardous environments. As these environments are seldom serviced by robust communication network infrastructures, data generated is usually buffered. Considerable latency develops between the data generation time and its availability at the processing/monitoring station. In machines that require real-time control inputs from the remote station, this latency cannot be tolerated. The disclosure optimizes the use of the available bandwidth to provide the data generated by the sensor at the remote monitoring station with minimum latency.

Tele-robotics: In robotic surgery systems, the surgeon commanding the procedure and the robot performing the procedure are physically located relatively closely. This limitation is typically due to the imaging and force-feedback systems which require a low latency. The low latency connection is generally provided by analog or dedicated high bandwidth digital connections between the robot and the operating stations. This method and corresponding devices enable substantial physical distance between the surgeon and the operating robot.

Remote Reconnaissance and Weapons Systems: The disclosure can be used to improve performance of remote weapons or surveillance systems equipped with multiple sensors such as CCD cameras, position sensors, laser range detectors, temperature sensors and actuators such as motors and relays. The method enables adaptive and individually-controlled resolution of several sensor data streams so that they are transmitted over a single communication system with minimized latency. The latency requirement is particularly beneficial for remotely operated weapons systems.

Video and audio server-client applications: The effectiveness of video and audio applications, such as teleconferencing and streaming video applications, decays rapidly when delays are introduced into the system due to network constraints and variability. The disclosure can be used to improve the performance of video and audio streaming and teleconferencing applications by minimizing the latency of the video and audio data and maintaining real-time communication between a stream server and a display client. In addition, the method also enables sub windowing of data so that data of more importance can be transmitted at higher resolution. For example, the portion within a video frame with the faces of people can be selected and transmitted at a high resolution to that of the background images within the video frame.

It can be conceived that the adaptive resolution adjustment and real-time measurement of network bandwidth can be incorporated into numerous server-client software applications for video and audio transmission over the internet. While the current state of art uses a single measurement of the bandwidth at the start of transmission, present disclosure can significantly enhance the user experience and reduce disruptions by adaptively adjusting the resolution based on the measured bandwidth throughout the transmission.

Remotely Operated Mapping Systems: The disclosure can be used to perform mobile mapping and/or surveying in which large data sets need to be transmitted over communication networks to remote monitoring sites.

The disclosure enables long-distance transmission over wide area networks of information from communication systems that have range limitations (e.g., control area networks (CAN) used in automobiles; serial and universal serial bus (USB) connections; and proprietary networks used for connecting machinery in factories). The method measures the network performance and adaptively controls the data transmission rates with the goal of minimizing the transmission latency. Use of this method allows sensor data to be transmitted on uncertain and variable bandwidth networks, as the system characterizes the network in real-time and adapts the transmission rate. Latency is monitored, measured and controlled to maintain the real-time nature of the system. Further, the method enables sub-windowing or sub-dividing the data streams and allows control over the resolution of each sub-window/division based on priority requirements or other preset conditions. Data streams from a plurality of sensors, motor controllers and actuators are merged into one data stream that is managed based on application requirements and not based on network conditions.

FIG. 1 illustrates a remote computing device 105 connected to one or more sensors 110 (such as sensor 115) and communicating with a control computing device 120 (which may perform monitoring and/or control) over a wide area communications network 125, such as the Internet or an intranet. These networks can consist of wired, wireless, or a combination of wired and wireless network segments.

The remote computing device 105 is responsible for the acquiring of data from the one or more sensors 110, such as sensor 115. Each sensor 110, such as sensor 115, is any component that can obtain data from its surrounding. The sensors 110 may also include robotic actuator components that are placed in an environment that allow the sensors 110 to collect raw sensor data 130. In one embodiment, the remote computing device 105 instructs one or more sensors 110 to collect raw sensors data 130. For example, one or more of the sensors 110, such as sensor 115, may be a microphone. Microphones pick up varying acoustic pressure waves and output analogously varying voltage signals. The raw sensor data 130 (e.g., the output voltage signals) are transmitted from the sensor 115 to the remote computing device 105. Other examples of sensor 115 include a video camera, a laser distance ranger, an infrared sensor, an encoder, etc. Examples of raw sensor data 130 include acoustic data, image data, control area network (CAN) data, custom data streams (e.g., video conferencing), etc.

In one embodiment, the remote computing device 105 is also responsible for analyzing the raw sensor data 130, reducing the data 130 to a smaller sample/bit rate, and then transmitting sensor data 150 through the communications network 125.

In addition, the remote computing device 105 is also responsible for executing any commands that are transmitted to it from the control computing device 120. These commands include instructions for reducing network data throughput as well as commands for controlling actuators that might be connected to the remote computing device 105. Examples of actuators include servos and/or motors.

Figure 2:
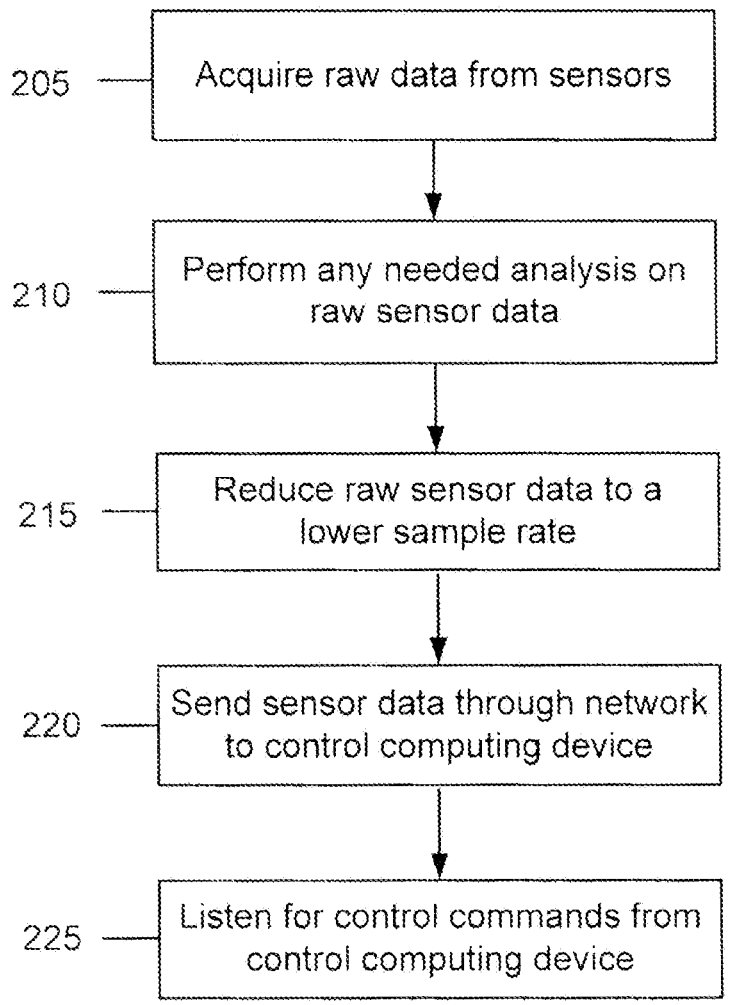
FIG. 2 is a flowchart of steps performed by the remote computing device of FIG. 1 in accordance with an embodiment of the present disclosure.

FIG. 2 describes an embodiment of steps performed by the remote computing device 105. The remote computing device 105 acquires the raw sensor data 130 from the sensors (step 205). In one embodiment, the remote computing device 105 reads the raw sensor data 130 from the sensor(s) 110 at a constant rate. Raw sensor data 130 can be acquired from various communication ports available on the hardware being used. In one embodiment, the raw sensor data 130 is acquired from one or more data ports simultaneously. After the raw data sensor 130 is acquired, the remote computing device 105 performs any needed analysis on the raw sensor data 130 (step 210).

In one embodiment, the analysis performed by the remote computing device 105 on the raw sensor data 130 is dependent upon the sensors 110 being used as well as the information that needs to be extracted from the raw data 130 collected. For example and as described above, microphones pick up varying acoustic pressure waves and output analogously varying voltage signals. If a user is interested in viewing the frequency characteristics from the voltage signals, then the data analysis portion of the remote computing device 105 can carry out spectral analysis on the voltage data and output the spectral information of the acoustic signals picked up by the sensors 110. Other types of data analysis might involve filtering to eliminate noise from the raw sensor data 130. In cases where data analysis is not necessary, this step can be skipped, however in most cases data analysis facilitates eliminating unnecessary information from the raw sensor data 130, thereby also reducing the throughput of the data.

In one embodiment, the control computing device 120 is responsible for displaying the data it receives from the remote computing device 105 on a display 140, executing algorithms for throughput and latency control, as well as sending commands back to the remote computing device 105.

In one embodiment, the remote computing device 105 then reduces the sensor data to a smaller bit rate (step 215). Data reduction is performed by reducing the number of data points that are being transmitted. A number of different data reduction methods can be used. These reduction methods include, for example, averaging over a group of data points, choosing singular data points that meet a specific criterion from a group of data points, or reducing the sample rate of the data by transmitting only a subset of the data. Each one of these reduction methods work by reducing the resolution of the data, therefore a tradeoff will exist between the bit rate of the data and the resolution of the data.

The remote computing device 105 then transmits sensor data 150 to the control computing device 120 (step 220). In one embodiment, in order to ensure that no sensor data 150 is lost during transmission and that all of the sensor data 150 is received in the proper order, a network protocol such as TCP, which guarantees reliable and in-order delivery of data, is used. In one embodiment, the sensor data 150 is encoded in a data format that is decoded when the message is received by the control computing device 120. In one embodiment, the security of data can be provided at both the application layer and network layer.

In a parallel process, commands from the control computing device 120 are received and executed by the remote computing device 105. In one embodiment, these commands include commands which define the transmission throughput for the data reduction step (step 215) as well as commands to control any actuators which may be connected to the remote computing device 105. In one embodiment, the remote computing device 105 listens for control commands from the control computing device 120 (step 225).

Figure 3:
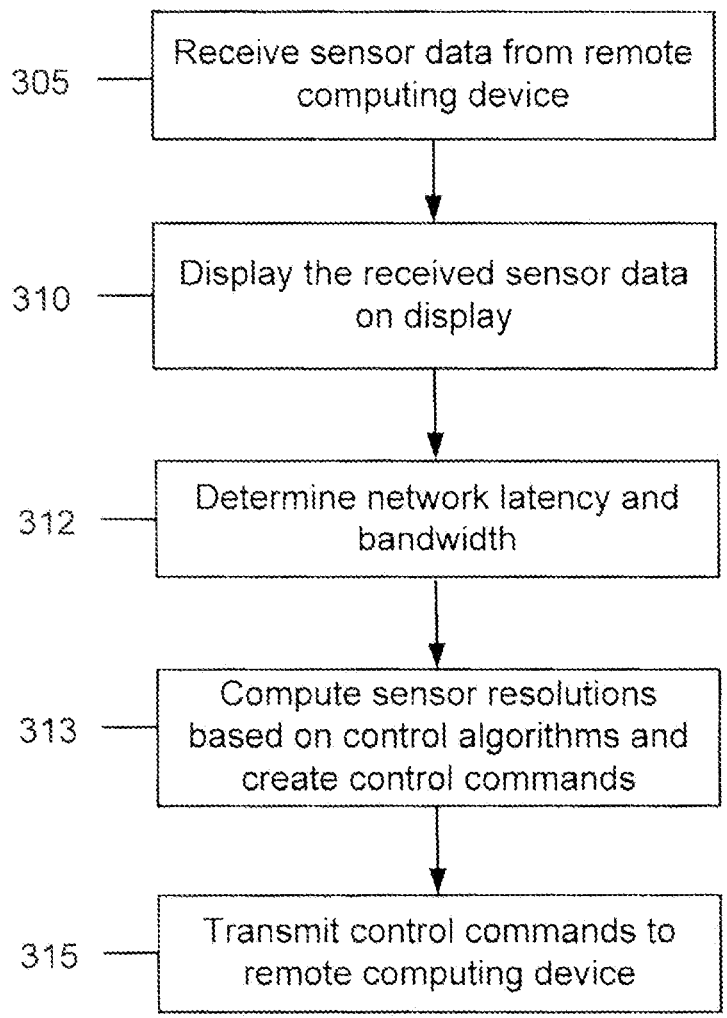
FIG. 3 is a flowchart of steps performed by the control computing device of FIG. 1 in accordance with an embodiment of the present disclosure.

FIG. 3 is a flowchart describing an embodiment of steps performed by the control computing device 120. The control computing device 120 receives (and decodes, if necessary) sensor data 150 from the remote computing device 105 (step 305). The control computing device 120 displays the received sensor data on display 140 (step 310). In one embodiment, the control computing device 120 determines network latency and bandwidth of the communications network (step 312).

The control computing device 120 is also responsible for defining the resolution and thus the throughput of the sensor data 150 that is transmitted by the remote computing device 105. The resolution of the sensor data 150 can be defined either by a user at the control computing device 120 or by automated control algorithms (step 313). In one embodiment, statistics such as the data latency, throughput of reduced data and the network bandwidth being utilized are displayed and plotted at the control computing device 120 to aid the user in defining the resolution of the data. In one embodiment, the control computing device transmits control commands 160, such as what the resolution of the reduced sensor data 150 should be, back to the remote computing device 105 (step 315). These commands allow the user at the control computing device 120 to control the various functions of the remote computing device. In one embodiment, the control commands 160 are generated by a processor. In a further embodiment, the user of the control computing device 120 provides one or more inputs to configure the control commands 160.

In one embodiment and as described in more detail below, applications can select sub-windows on data frames such that the data transmitted contains features that have been deemed to be important (e.g., by the user of the control computing device 120).

For purposes of this disclosure (and as described in more detail below with respect to FIG. 15), a computer or computing device such as the computing device 105 and/or control computing device 120 includes a processor and memory for storing and executing program code, data and software which may also be tangibly stored or read from any type or variety of well known computer readable storage media such as magnetic or optical discs, by way of non-limiting example. Computers can be provided with operating systems that allow the execution of software applications in, order to manipulate data. Personal computers, network devices (e.g., routers), personal digital assistants (PDAs), wireless devices, cellular telephones, internet appliances, media players, servers, and embedded devices are several non-limiting examples of computing devices. The remote computing device 105 and the control computing device 120 can, in one embodiment, also include a display, such as a screen or monitor (e.g., display 140). In one embodiment, the control computing device 120 is a server computer.

Figure 4:
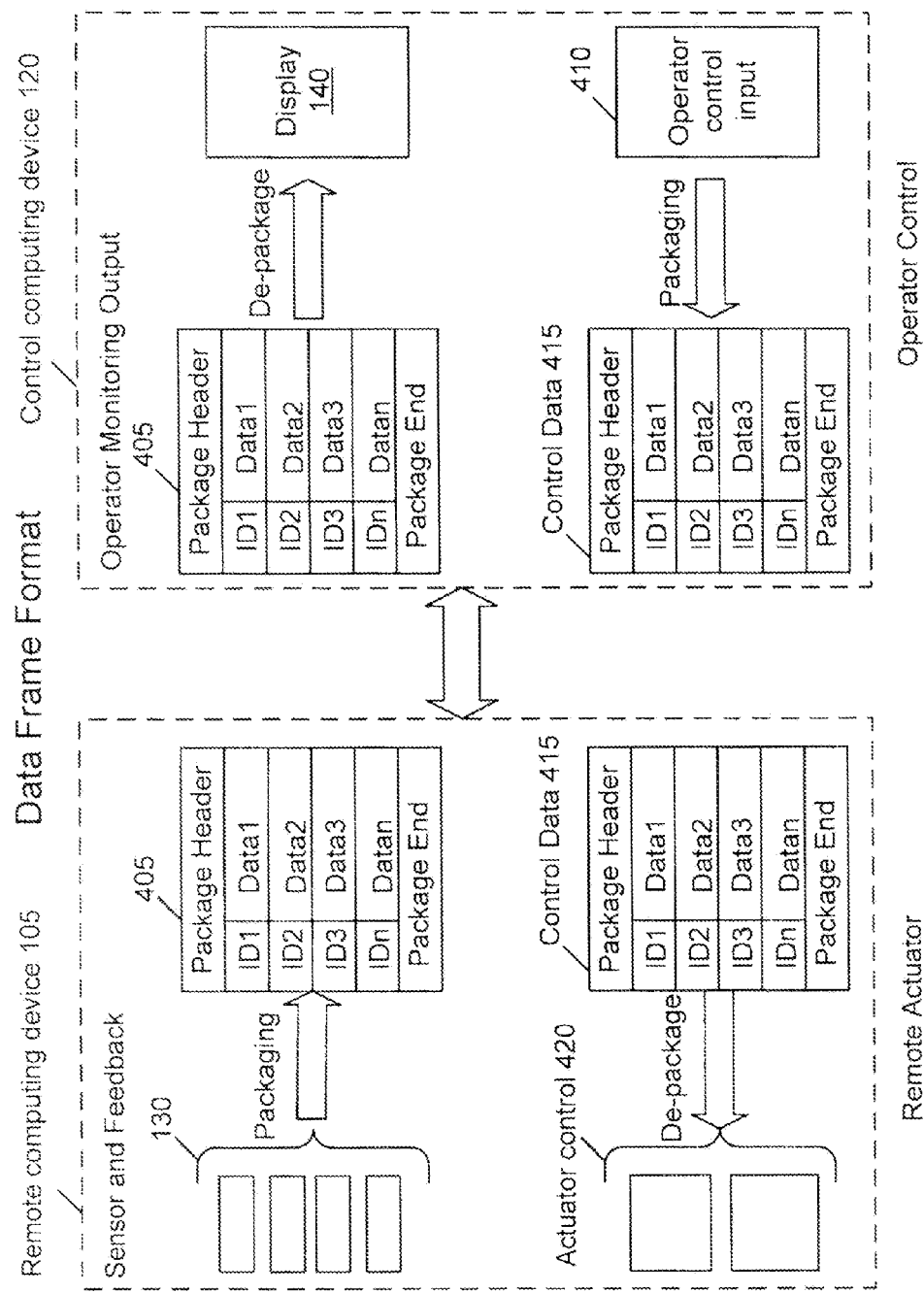
FIG. 4 is a block diagram of the data frame format of sensor data and control commands in accordance with an embodiment of the present disclosure.

FIG. 4 is a block diagram of an embodiment of the data frame format of the sensor data 150 and the control commands 160. The raw sensor data 130 is packaged by the remote computing device 105 into sensor data 405, which includes package header, data, data identifiers, and package end. As described above, the sensor data 405 is transmitted to the control computing device 120.

The control computing device 120 receives the packaged sensor data 405 and de-packages the sensor data 405 so that the control computing device 120 can display the sensor data via the display 140. In one embodiment, the user or operator submits input 410 to the control computing device 120. The control computing device 120 packages the input 410 into control data 415 and transmits the control data 415 to the remote computing device 105. In one embodiment, the remote computing device 105 de-packages the control data 415 and controls an actuator via actuator control 420.

In one embodiment, appropriate data frame formats that incorporate sensor data, time stamps that enable measurement of network latency and control messages between the control and remote computing devices are formulated. Specific data origin identification is assigned to different local data protocols, sensory data are packaged into a single frame with sensor ID, and control data using control ID and communication is given by control ID to ensure that data flow has been transmitted and translated correctly. The frames are transmitted using the protocols native to the communications network.

As described in more detail below, end-to-end latency is measured without precise time synchronization but only with loop completion time on the transmitting side. Frames are separated with a known constant delay. Frame arrival time differences are the sum of variable transport latency and buffer size. The output buffer size is the frames waiting to be transmitted. In one embodiment, the end-to-end latency is determined by the frame arrival rate.

In another embodiment, the control computing device 120 and/or the remote computing device 105 are embedded control systems that dynamically reduce the network demand to limit the total latency. In one embodiment, the sensors 110 operate at full resolution and frame rate. Data acquisition and frame assembly is adaptively modified as dictated by application context. In one embodiment, if the resolution is reduced, the frame rate is kept constant, while if the frame rate is reduced, the resolution is kept constant. In another embodiment, a hybrid combination of frame rate and resolutions occurs.

EXAMPLE IMPLEMENTATION

Figure 5:
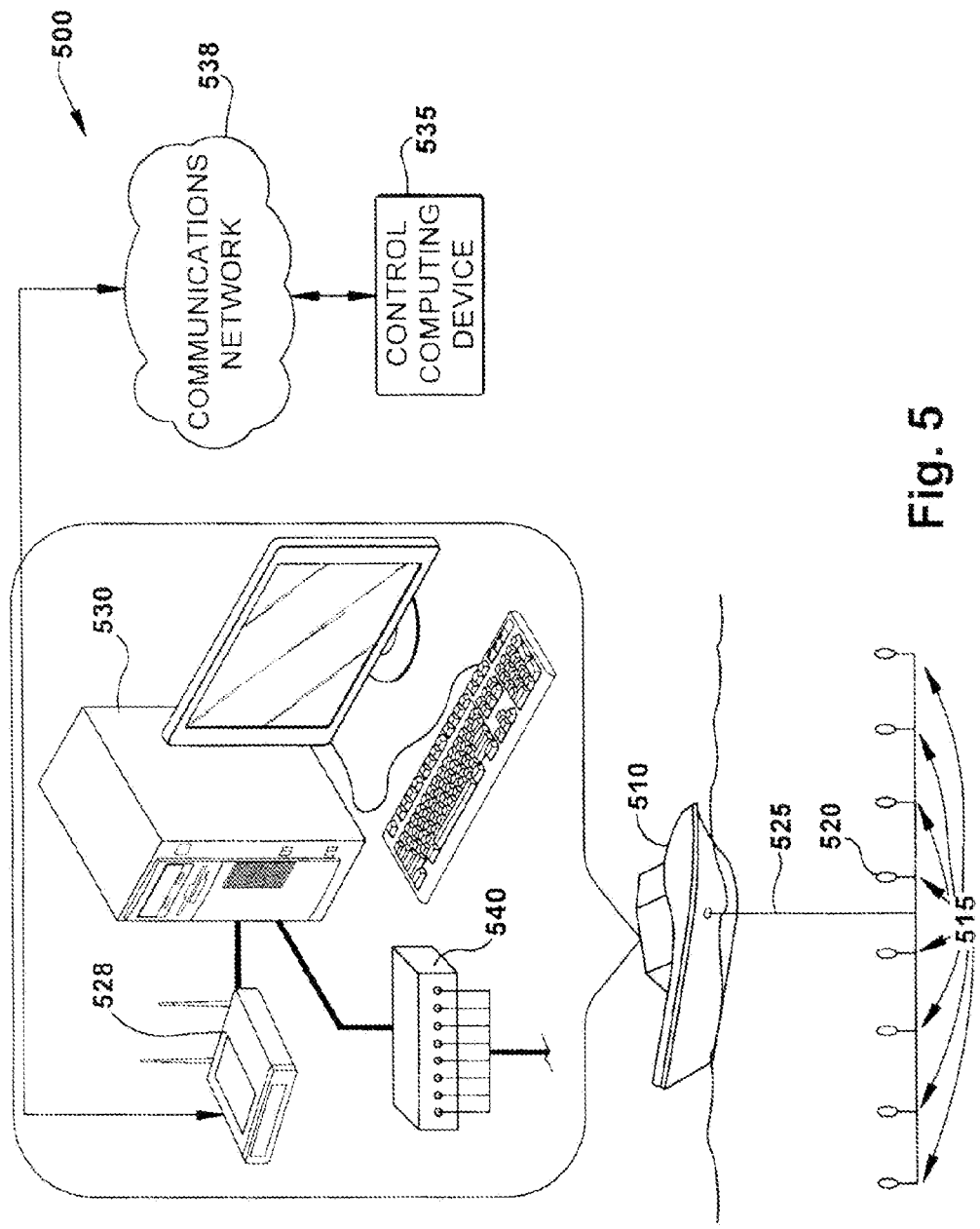
FIG. 5 is a block diagram of an example system including a boat connected to a plurality of hydrophones in accordance with an embodiment of the present disclosure.

FIG. 5 shows a block diagram of an embodiment of an example system including a boat 510 connected to a plurality of (in this example, eight) hydrophones 515 (e.g., hydrophone 520) via a hydrophone cable 525. The hydrophones are situated at a remote offshore location. The hydrophones are used to pick up acoustic signals underwater. Similar to microphones, they work as sound to electricity transducers. In one embodiment, the hydrophones are placed a couple of hundred feet offshore and a wireless router 528 is used to transmit the data from the remote computing device 530 to the control computing device 535 over wireless network 538.

i) Remote Computing Device 530

In the boat example mentioned above, to obtain voltage data from the hydrophones 515, each hydrophone is connected to a hydrophone terminal box 540. In one embodiment, this terminal box 540 outputs the hydrophone voltage reading from the different input jacks to a data acquisition card connected to the remote computing device. In one embodiment, the remote computing device 530 has the ability to acquire data from eight different channels simultaneously at a sample rate up to 500 Kilo-samples per second (KS/s) per channel. In one embodiment, the remote computing device 530 can acquire data from eight channels (one for each hydrophone 520) at a sample rate of 200 KS/s per channel. In one embodiment, once the user executes an input program, the remote computing device 530 acquires the voltage reading from the eight hydrophones 515 at the specified sample rate and outputs it to a display associated with the remote computing device 530.

In one embodiment, the information of interest is the frequency characteristics of the acoustic signals detected by the hydrophones 515. Therefore, after the remote computing device 530 acquires voltage data, in one embodiment a Fast Fourier transform (FFT) spectrum analyzer function is used to calculate the power spectral density of the voltage signals. The output from this spectral analysis function is an array of spectral magnitude measurements of 100 KS/s for each hydrophone 520 in the frequency range of 1 Hz-100 KHz.

In addition to specifying the sample rate, the user of the remote computing device 530 also has the ability to choose how many samples to read at a time from the data acquisition function and analyze using the FFT spectrum analyzer. The number of samples the user reads at a time determines the acquisition resolution of the spectral measurements. The resolution of the spectral measurement ($S_{res}$) is equal to the sample rate (SR) divided by the number of samples ($N_s$) acquired ($S_{res}$=SR/$N_s$). For example, if the user decides to read 200 KS at a time, then the data acquisition function will output 200 KS of voltage readings from each hydrophone 520 every second. After the remote computing device 530 performs spectral analysis on this data, the result will be spectral measurements of 100 KS. In one embodiment, since the remote computing device 530 calculates the spectral readings for a frequency range of 1 Hz-100 KHz, this corresponds to a spectral resolution of 1 Hz per sample. On the other hand, if the user decided to read data 20 KS at a time, then the data acquisition function will output 20 KS of voltage readings every 0.1 seconds and this will result in spectral measurements of 10 KS. Again since the frequency range is 1 Hz-100 KHz this will result in a resolution of the spectral measurements of 10 Hz per sample. Although the user can change the number of samples to read at a time, the sample rate for both the data acquisition function (200 KS/s) and the spectrum analysis function (100 KS/s) stay the same.

In one embodiment, the spectral measurements are placed in an eight-column array (one column for each channel). This array is then queued inside a data buffer in the order it is received. Both the data acquisition and the data analysis functions have been placed in the same while loop, therefore the software program executing on the remote computing device 530 will continuously keep acquiring data, performing spectral analysis, and inputting data in the buffer at the constant rate specified by the user until the software program is stopped.

For the specific boat example mentioned above, a wireless network is used that has a measured available bandwidth of about 1-3.5 Mbps. Transmitting the raw sensor data from the sensors (1.6 MS/s or 25.6 Mbps) or the spectral data at a sample rate of 100 KS/s per hydrophone 520 (800 KS/s or 12.8 Mbps for all eight hydrophones) is therefore not feasible as the network will not be able to transmit data at such a high bit rate. Reduction of the data to a smaller sample rate is therefore needed. In one embodiment, a software program reduces the data using one of three different reduction modes named Mean Reduction, Max Reduction, and Min Reduction.

Figure 6:
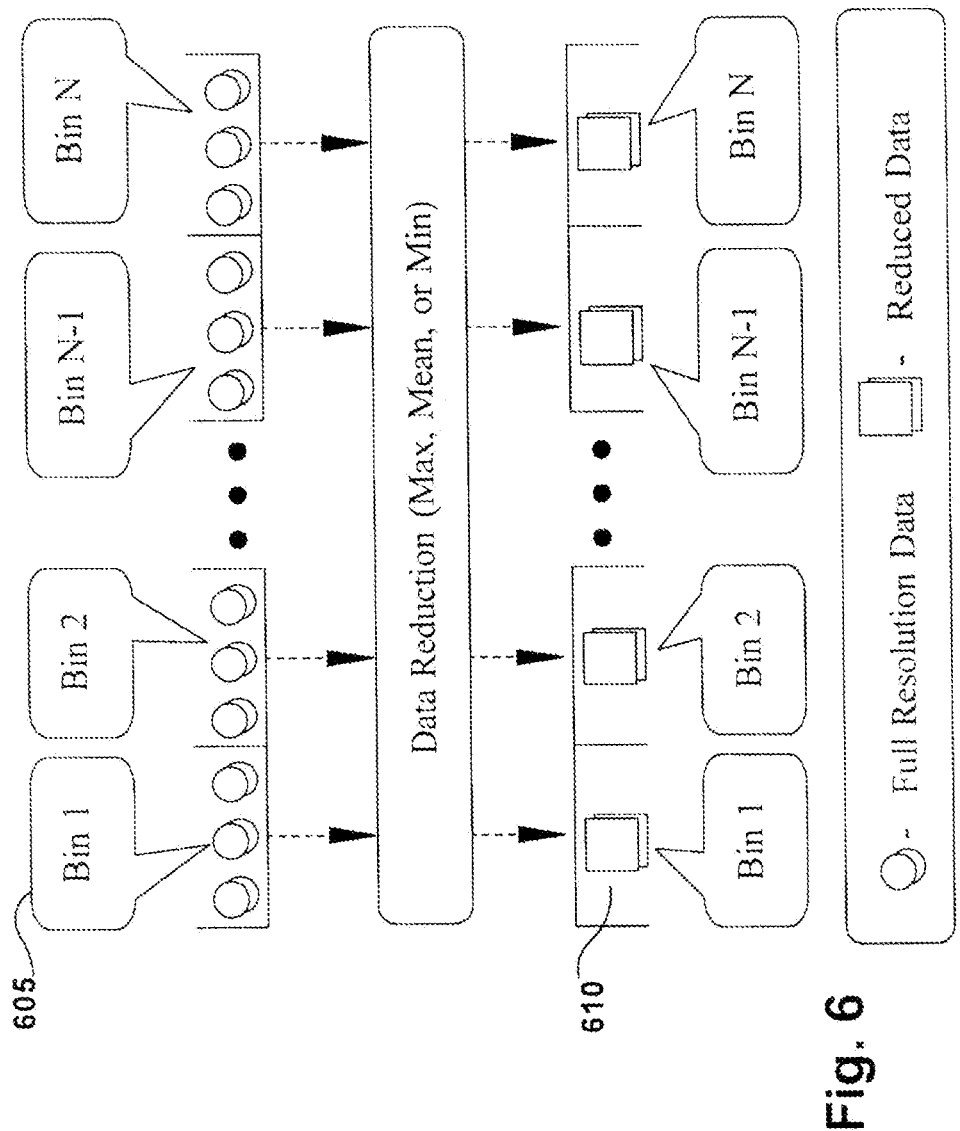
FIG. 6 is a flow diagram illustrating the application of a data reduction technique to sensor data in accordance with an embodiment of the present disclosure.
Figure 7A:
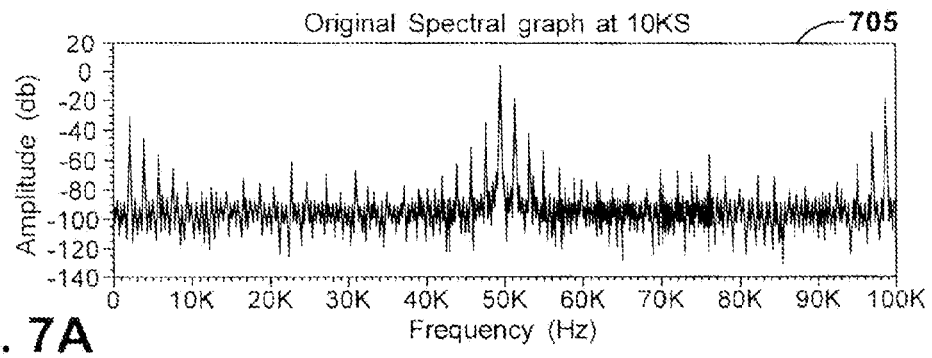
FIGS. 7A-7D illustrate example graphical representations of various data reduction techniques in accordance with an embodiment of the present disclosure.
Figure 7B:
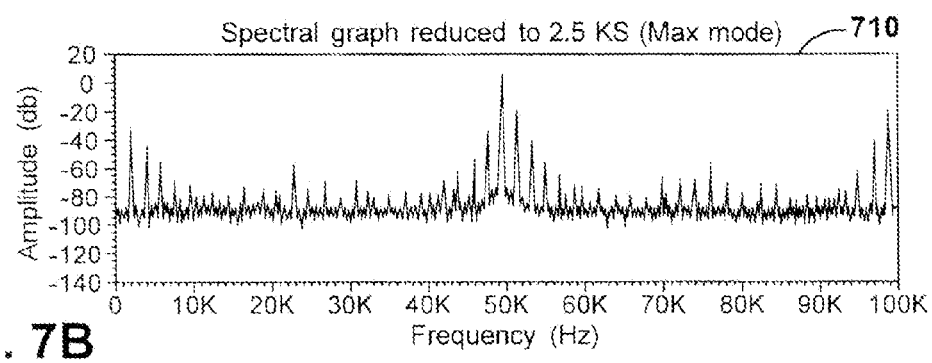
Figure 7C:
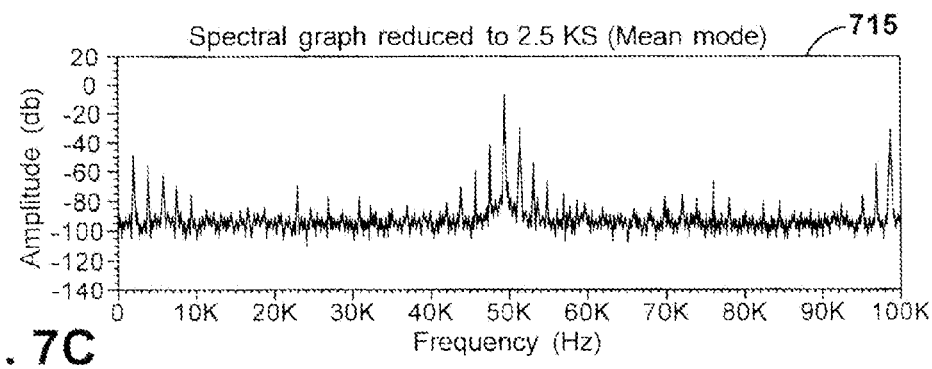
Figure 7D:
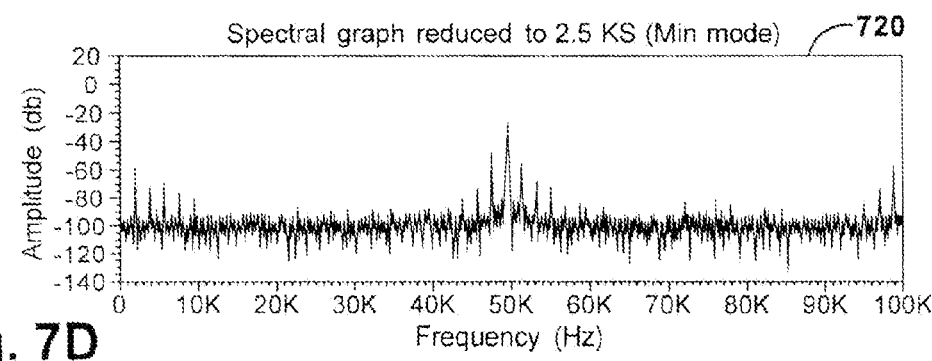
Figure 8A:
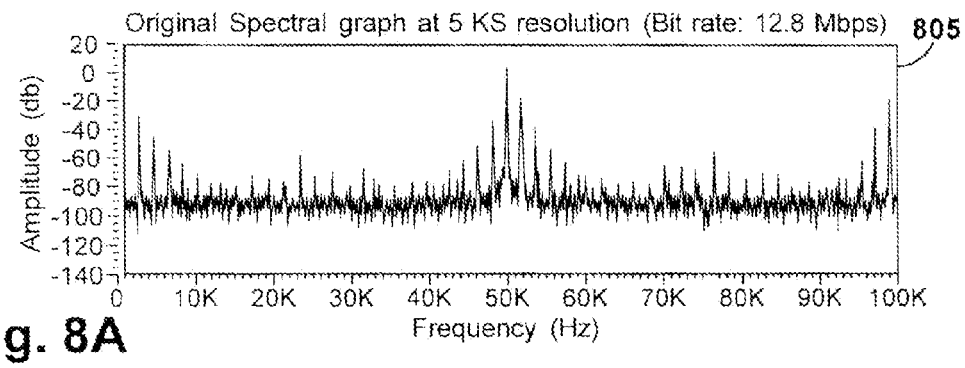
FIGS. 8A-8D illustrate example graphical representations of different resolutions using a maximum reduction technique in accordance with an embodiment of the present disclosure.
Figure 8B:
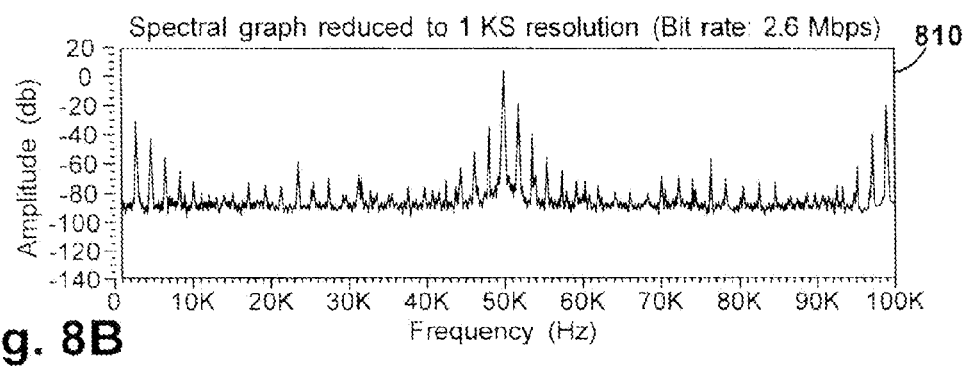
Figure 8C:
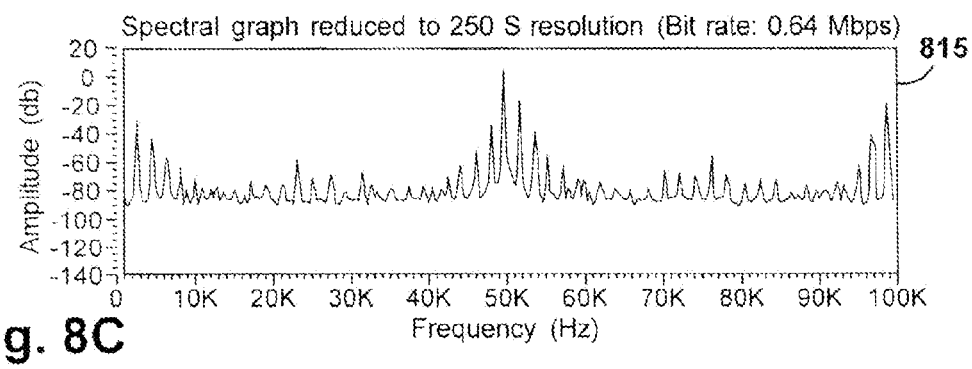
Figure 8D:
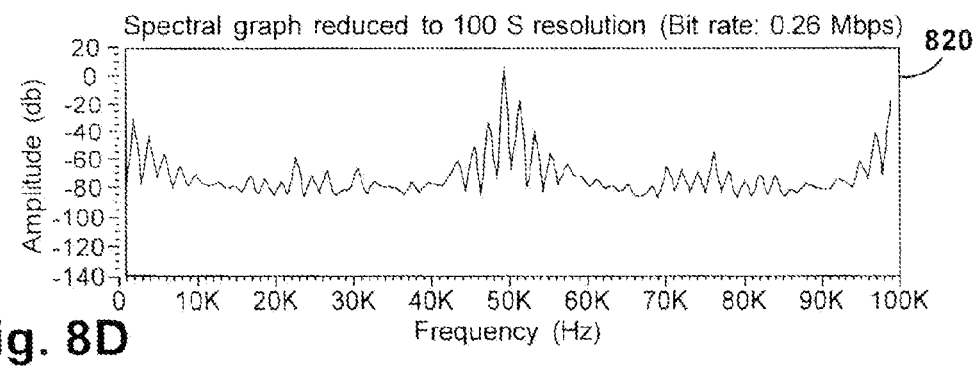

Referring to FIG. 6, in one embodiment the three data reduction methods work by reducing the resolution of the spectral measurements—they take a specified number of spectral measurements and reduce them into a single spectral measurement. So, for example, to convert 100 KS of spectral measurements (1 spectral reading for every Hz) into 10 KS of spectral measurements (which equates to converting 100 KS/s into 10 KS/s), the data reduction software program takes every bin (e.g., bin 605) of 10 spectral measurements (1 Hz-10 Hz, 11 Hz-20 Hz, 21 Hz-30 Hz . . . 999,991 Hz-100 KHz) and converts them into a single spectral measurement (e.g., measurement 610) which represents the corresponding frequency range. Doing this reduces both the number of samples and the resolution of the spectral measurements. The technique used by the software program to convert the bin of spectral measurements into a single spectral measurement depends on the reduction mode used.

In the Mean Reduction mode, the remote computing device 530 calculates the mean value of the bin of spectral measurements and assigns this mean value as the single spectral measurement for the frequency range of that bin. The Max Reduction method picks the maximum value from the spectral measurements and assigns this as the single spectral measurement for the frequency range. Similarly, the Min Reduction mode picks the minimum spectral measurement value and assigns this as the single spectral measurement for the corresponding frequency range. FIGS. 7A-7D show the plots 705, 710, 715, 720 of a spectral graph that have been reduced from 10 KS to 2.5 KS using the three different reduction modes. From the plots it can be seen that the Max Reduction mode preserves many of the high peaks in the signal after Reduction, while the Min Reduction mode preserves the low peaks. The Mean Reduction mode provides a mix of both the max and the min reduction mode and produces a result in between the two extremes.

In one embodiment, the information of interest in most frequency plots is the high peaks, therefore the Max Reduction mode is the most suitable reduction method to use. To demonstrate how the signal quality is affected by the resolution, FIGS. 8A-8D show plots 805, 810, 815, 820 of a spectral graph that has been reduced to three different resolutions using the Max Reduction method along with the transmission bit rates associated with transmitting data for eight channels using these resolutions. From this figure the degradation of the signal frequency resolution is evident, however it can be seen that, even at 5% of the original resolution, most of the peaks from the original signal are still present. Another important thing to note is that the reduction in data throughput is proportional to the reduction in resolution. This means that by transmitting at 5% of the full resolution, the data throughput can also be reduced to 5% of the throughput at full resolution.

The data reduction algorithm is located in a parallel loop to the data acquisition and data analysis function. It reads the original spectral data placed in the buffer by the data analysis function and reduces it to the sample rate specified by the user. It should be noted that more efficient and even lossless compression methods could be employed to improve the signal quality of the compressed data; however they are not used in this example system due to the real-time constraint imposed on the system. While the lossy compression methods described above do result in some degradation of the original signal during compression, they are relatively fast at data reduction, making them more suitable for real-time transmission applications. In addition, these methods use less computational resources compared to other more complex reduction methods, thereby freeing up these resources for more computation intensive processes, such as other signal processing, and user interface and display processes.

Figure 9:
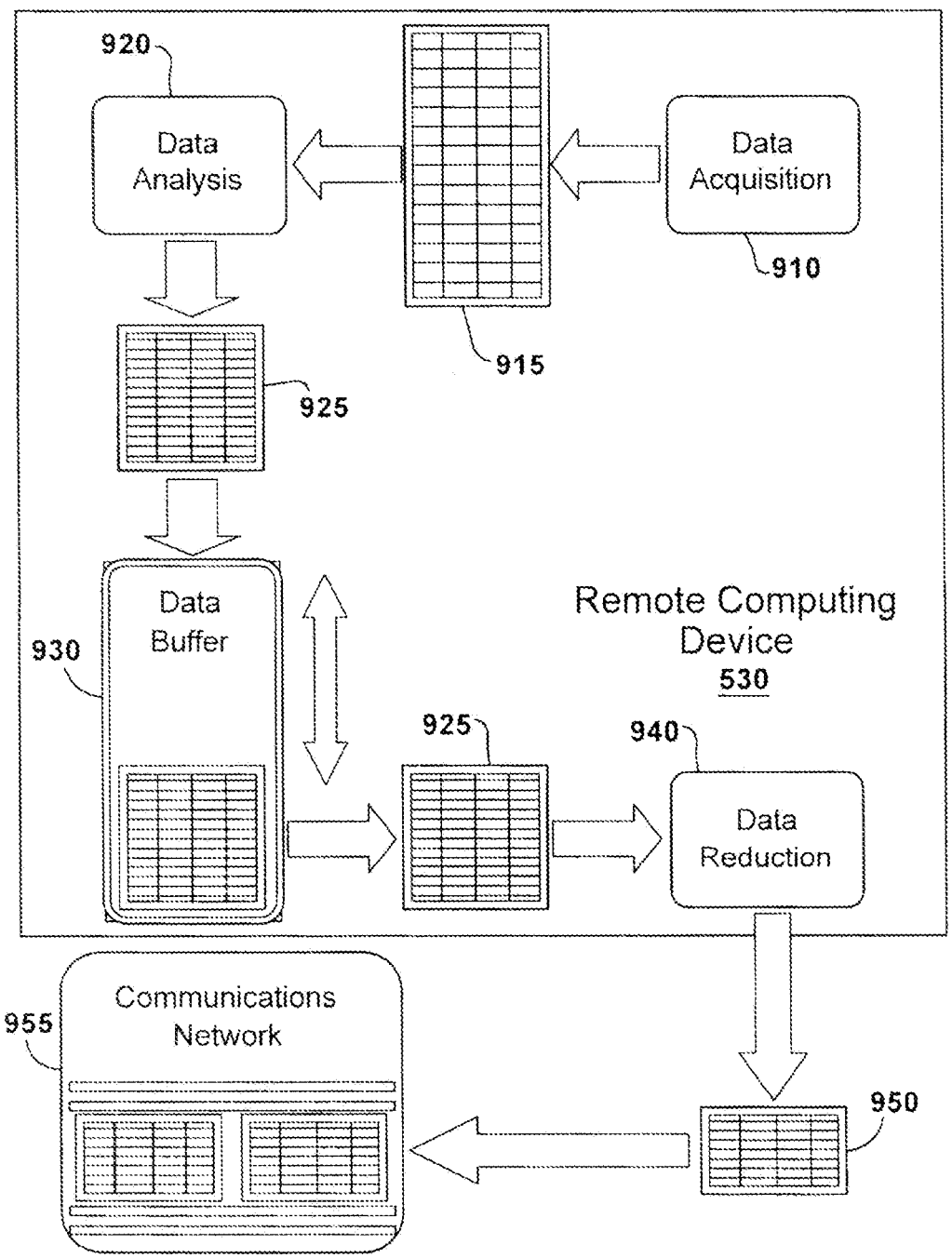
FIG. 9 illustrates a flow diagram of the remote computing device in accordance with an embodiment of the present disclosure.
Figure 13A:
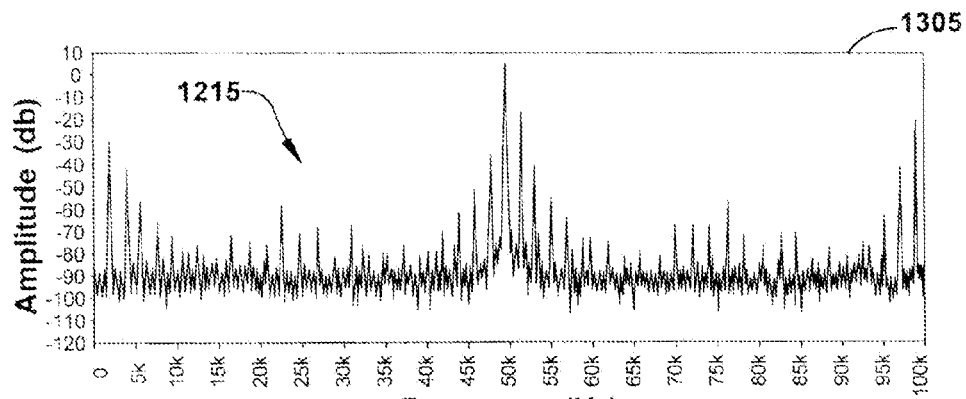
FIGS. 13A-13F illustrate graphical representations of signal resolution at different points shown in FIGS. 12A-12B in accordance with an embodiment of the present disclosure.
Figure 13B:
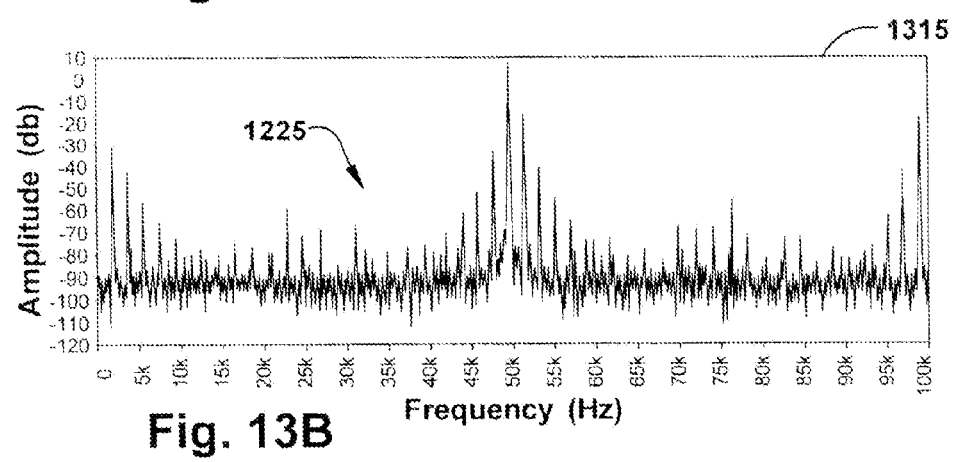
Figure 13C:
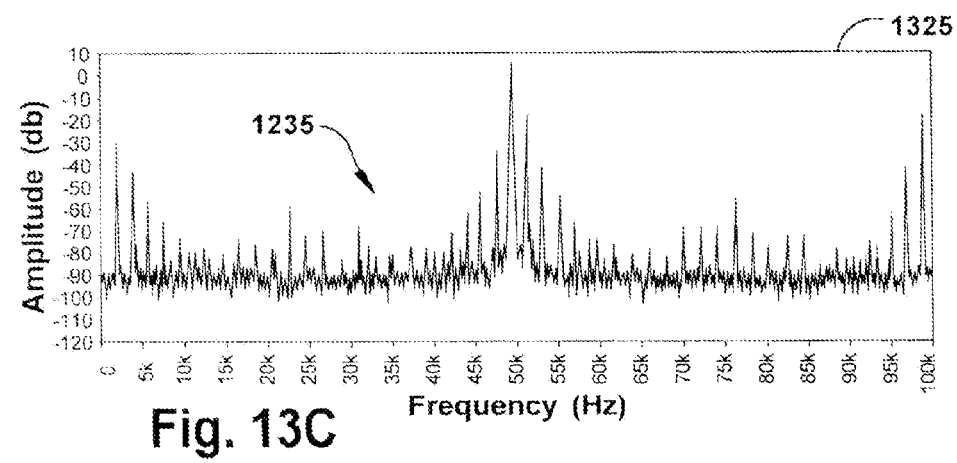
Figure 13D:
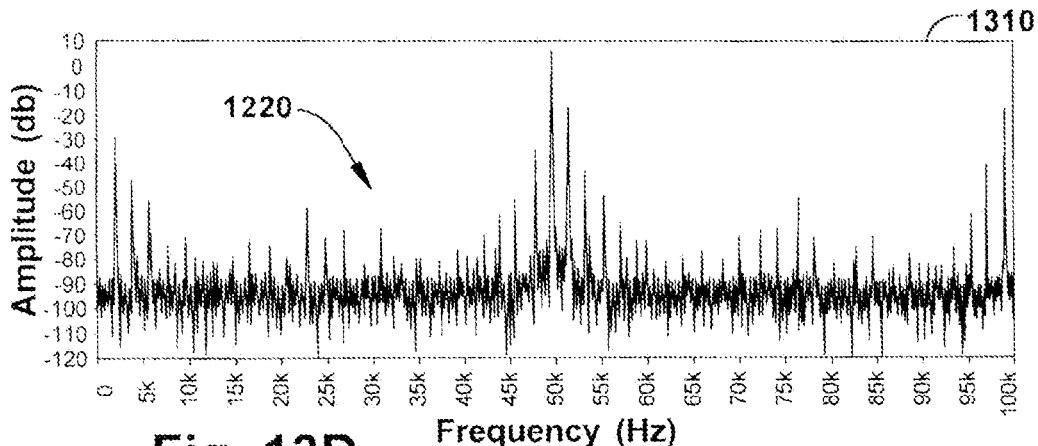
Figure 13E:
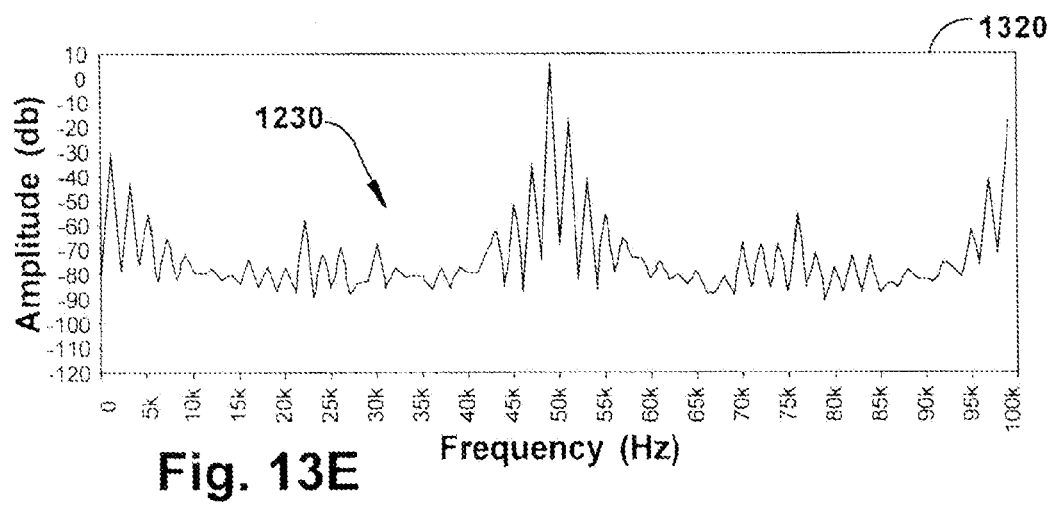
Figure 13F:
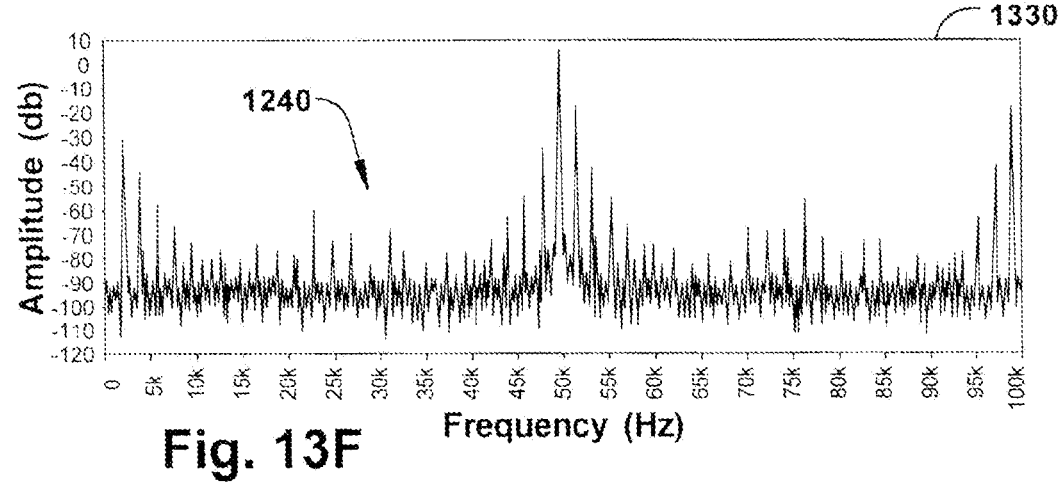

FIG. 9 illustrates an embodiment of a flow diagram of the remote computing device 530. As described above, the remote computing device 530 acquires raw sensor data via a data acquisition module 910. Raw sensor data 915 is then analyzed via a data analysis module 920. In one embodiment, the output of the data analysis module 920 is high resolution preprocessed data 925. This data 925 is transmitted to a data buffer 930. The remote computing device 530 then executes the data reduction module 940 on the high resolution preprocessed data 925 stored in buffer 930 to reduce the bit rate of the preprocessed data. The reduced resolution data 950 is then transmitted (e.g., by a data transmission module) over the wireless network 955 to the control computing device 535.

While the remote computing device 530 acquires, analyzes, and reduces sensor data, in one embodiment the remote computing device 530 simultaneously listens for a TCP connection on the wireless network. Once a TCP network connection is established by the control computing device 535, the remote computing device automatically sends the reduced data 950 through the wireless network 955 to the control computing device 535. The TCP connection enables full duplex communications, therefore the remote computing device can receive control commands from the control computing device at the same time that it is transmitting data.

In the example boat application, due to the movement of the boat 510, as a result of waves and wakes from other boats, as well as possible interference from other radio signals; the bit rate of the wireless signal constantly fluctuates. In some embodiments, the wireless signal could even temporarily lose connection. During these conditions when the wireless bit rate is low or when the wireless connection is lost, the amount of data 925 stored in the buffer 930 increases as data 925 is inserted into the buffer 930 faster than it is extracted. When the bit rate for the wireless connection increases the buffer 930 will begin to empty out as data 925 is extracted from the buffer 930 faster than it is added. The bit rate of the reduced data 950 needs to be lower than the available bandwidth of the wireless network 955 in order to enable real-time communications. The advantage of using a buffer 930 is that it enables the system to be more resistant to data lost during fluctuations in network bandwidth; the downside of using a buffer 930 is that it can introduce data latency into the system during cases when the wireless signal has low transmission speed.

Although the main purpose of the remote computing device 530 is to transmit data 950 to the control computing device 535, it can also be used as a standalone application to acquire and analyze the data 915 generated from the hydrophones 515. Users can use a display associated with the remote computing device 530 to view plots of hydrophone data as well as control and view how the remote computing device 530 is functioning using the various controls and indicators located on the display. In addition, in one embodiment the remote computing device 530 also has the ability to save the raw voltage data generated by the hydrophones 515 and communicate with the control computer users (e.g., using text messages).

ii) Control Computing Device 535

The control computing device 535 automatically opens a network connection with the remote computing device 530 and starts receiving the reduced spectral data 950. As described above, in one embodiment the data being sent by the remote computing device 530 is encoded in a data frame format 405, as information about the data and the remote computing device 530 is also being transmitted along with the actual reduced spectral data 950. The same data frame format is therefore used by the control computing device 535 to decode the transmitted data. Once the reduced spectral data is extracted, it is in one embodiment displayed on graphs similar to those found on the remote computing device 530.

In one embodiment, at the same time the control computing device 535 is receiving data, it is also sending control commands from the user back to the remote computing device 530. The commands that are sent back to the remote computing device 530 include the desired resolution of the reduced data, the reduction mode to use, the limit of the buffer and whether or not the remote computing device 530 should save the raw voltage data from the hydrophones 515. In one embodiment, as soon as the control computing device 535 establishes a connection with the remote computing device 530, it will take over control of one or more functions of the remote computing device 530. In one embodiment, the user on the boat 510 will still be able to view the data from the hydrophones 515 as well as control functions that do not affect the transmission of data to the control computing device 535. In one embodiment, the users of the remote computing device 530 have the ability to take over control of the remote computing device 530 and only allow monitoring privileges to the control computing device 535.

In one embodiment, the user interface of the control computing device 535 is similar to the user interface of the remote computing device 530 with the exception of a few differences. In one embodiment, the throughput (bit rate at which the reduced spectral data is being read in) and the latency of the data received is displayed on graphs on the control computing device.

iii) Control Strategies

The introduction of the data buffer 930 to the system introduces the possibility of increasing the data latency in the system. The amount of data stored in the buffer 930 needs to be minimized to reduce the data transmission latency in the system. In order to better meet the real-time requirement of the system, in one embodiment one of several different latency control policies can be implemented. For example, a first policy is a completely user controlled policy, a second policy is a limit or binary control policy and a third policy is a real-time adaptive optimization control policy.

a) Manual Control

In the first policy, the user at the control computing device 535 has complete control permission over the system and is therefore responsible for minimizing the data latency in the system. To do this, the user manually adjusts the resolution/throughput of the data to be less than or equal to the current network bandwidth, thereby minimizing the buildup of data in the buffer 930.

The current statistics of the data, such as the data throughput, the measured network bandwidth being utilized as well as the data latency in the system, are plotted in real-time on the display of the control computing device 535 and can be used by the operator to determine what resolution/throughput the operator should use. FIGS. 10A-10B show an example of these plots 1005, 1010. On plot 1005, the data throughput and the network bandwidth being utilized are shown overlaid over each other, while on plot 1010 the data latency is shown. If, for example, the throughput was set at a level higher than the available network bandwidth, the operator would be able to detect this from the rise in latency on plot 1010 and the difference between the graphs on plot 1005 and reduce the throughput accordingly.

In case the operator fails to adjust the throughput properly, a limit can also be set on how much data can be stored in the buffer 930. If the buffer 930 reaches this limit, then in one embodiment the data 925 stored in the buffer 930 is automatically emptied and the most recent data 925 is transmitted instead. This allows the operator to specify the maximum amount of data latency in the system, as well as limit the amount of memory used by the system. This, however, also means that the data 925 that was in the buffer 930 before it was emptied will be lost.

While the manual control policy helps the user control the resolution of the data to minimize the latency, it can detract the user from focusing on the data as the user is likely also preoccupied with controlling the throughput of the system. In the following policies, the process of controlling the system throughput has been automated using control algorithms, thereby relieving the burden of throughput control from the user.

b) Limit Control

In the limit or binary control strategy, a latency limit is used to control the throughput of the system. In this control method, the user specifies a low throughput for the transmitted data 950 that is known to be well below the available network bandwidth and defines a maximum latency limit for the system. The user can then run the above described steps with a desired throughput for the system. The system will try to transmit the data 950 at the user specified throughput. However, if at any time the data latency in the system exceeds the latency limit, the limit control automatically takes over and switches the throughput of the system to the low throughput specified by the operator to allow the latency to return to the minimum. Once the latency has been minimized the program switches back to the user defined throughput and relinquishes its control back to the user. Using this method there is no data package loss as the buffer 930 is not allowed to fill up and the maximum latency in the system is also limited to a user defined value, thereby maintaining the real-time/near real-time nature of the system.

FIGS. 11A-11B show the response of the system while using the limit control policy. For FIGS. 11A-11B, the system was operated using a controlled LAN network environment where the actual bandwidth of the network was set using external software. By running the system in a controlled network environment, the response of the system under different network conditions can be obtained.

Plot 1105 shows the system throughput (solid black line) and the measured network bandwidth averaged over 10 seconds (dashed black line), while plot 1110 shows the data latency (solid black line), the latency limit (dotted black line) and the minimum latency (dashed black line). For this particular figure, the network bandwidth was adjusted from 5 Mbps to 4 Mbps to 3 Mbps at 180 second increments. The low throughput for the system was set to 2 Mbps, the desired throughput of the system was set to 6 Mbps, and the latency limit was set to 3 seconds.

It can be seen from plot 1110 that for the majority of the time the system was able to keep the latency in the system below the latency limit. The latency overshooting the limits were due to network delays associated with variable link bandwidth. As the network bandwidth was decreased further, these overshoots became more pronounced. Plot 1105 shows that the measured network bandwidth correlates with the value set by the bandwidth controller software, which implies that the system was fully utilizing the available bandwidth of the communications network. Another observation from FIGS. 11A-11B is that the time spent at the low throughput level increases as the network bandwidth decreases. This is due to the fact that as the bandwidth decreases, data is extracted from the buffer 930 at a slower rate and thus it takes longer to empty the buffer 930.

The response characteristics of the limit control method are important to note because when the system is executed on an uncontrolled or public network, the bandwidth of the network is unknown and highly variable. In this case, these system characteristics will be helpful in making a good estimation of the network bandwidth so that adjustments can be made to the desired system throughput accordingly. While the desired resolution throughput has been kept at a constant value of 6 Mbps for the test, it can be adjusted by the operator while the system is running. Since plots 1105, 1110 are available to the operator in real-time, they allow the operator to match the desired system throughput to the available network bandwidth by using the information provided in the plots 1105, 1110.

In one embodiment, the application of the limit control policy is not for optimizing throughput. Rather, the limit control is more helpful for insuring that the latency limit is not exceeded and data is not lost due to buffer overflow during low network bandwidth situations due to momentary interruptions in the network. As such, the desired throughput level initially defined by the operator should be set to a level below the available network bandwidth for the majority of the time.

c) Adaptive Optimization Control

The adaptive optimization control policy is a fully automated control strategy that does not require interaction from the operator once the reference parameters are set. The policy is used for minimizing the latency while at the same time optimizing the throughput/resolution of the system. Similar to the limit control policy, the adaptive optimization scheme applies the resolution/throughput as the control variable and the latency as the feedback parameter. In this control approach, the user specifies a target and limit latency for the system. This control policy applies these two variables to adjust the resolution of the transmitted data so that the latency in the system matches the target latency set by the operator. Once the set latency has been reached, the program will try to optimize the throughput of the system. It does this by gradually increasing the throughput of the system while using the latency as its feedback parameter to detect when the network bandwidth has been exceeded. When the latency begins to increase the system automatically reduces the resolution so that the latency is again minimized and the throughput of the system is matched closely to the network bandwidth thus optimizing the throughput of the system.

When increasing the throughput, one of two different rates, a fast rate and a slow rate, is used by the control algorithm. The fast rate is used when the system is searching for the network bandwidth while the slow rate is used when the system calculates that it is in the neighborhood of the available network bandwidth. This is completed so that the system can quickly find the network bandwidth while in searching mode as well as to finely adjust the system throughput when it is close to the network bandwidth.

The response of the system run using the adaptive optimization control policy is shown in FIGS. 12A-12B. Similar to the limit control, this test was also executed using a controlled LAN network environment. For this test, the network bandwidth was adjusted from 3 to 7 to 4 to 1 to 2 to 5 Mbps at 300-second increments. A stricter latency limit of 1 second was also applied. As can be seen from plots 1205 and 1210, the control strategy does well in finding the current network bandwidth and optimizing the system throughput while maintaining the data latency below the latency limit. In fact, the system throughput matched the network bandwidth so well that the two graphs are barely indistinguishable on plot 1205. There are, however, two distinct places, the first around 360 seconds and the second at around 550 seconds, where the latency limit was exceeded. Locating these two points on plot 1205, it shows that both of these cases were a result of a rapid decrease in network bandwidth. While the latency limit was momentarily exceeded, the system was able to quickly recover and return the latency below the latency limit.

FIGS. 13A-13F shows exemplary plots 1305, 1310, 1315, 1320, 1325, 1330 of the resolution at which the user of the control computing device 535 observes the transmitted data for the corresponding point 1215, 1220, 1225, 1230, 1235, 1240 marked on plot 1205 of FIG. 12A.

Figure 14A:
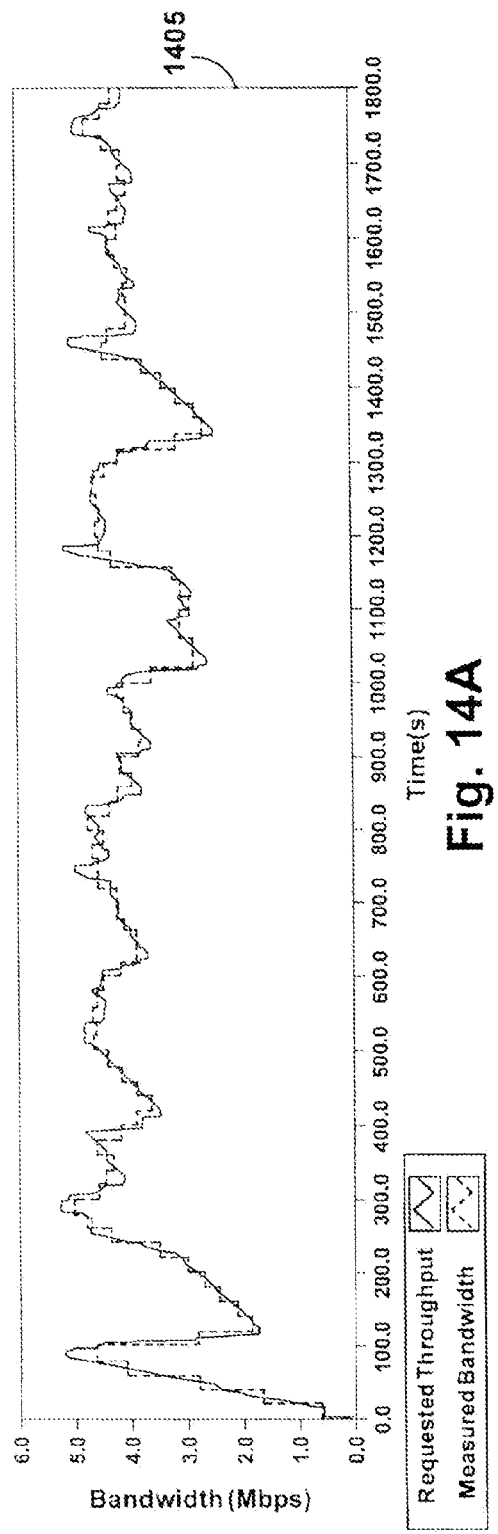
FIGS. 14A and 14B illustrate graphical representations of an uncontrolled wireless network test of the system of FIG. 1 in accordance with an embodiment of the present disclosure.
Figure 14B:
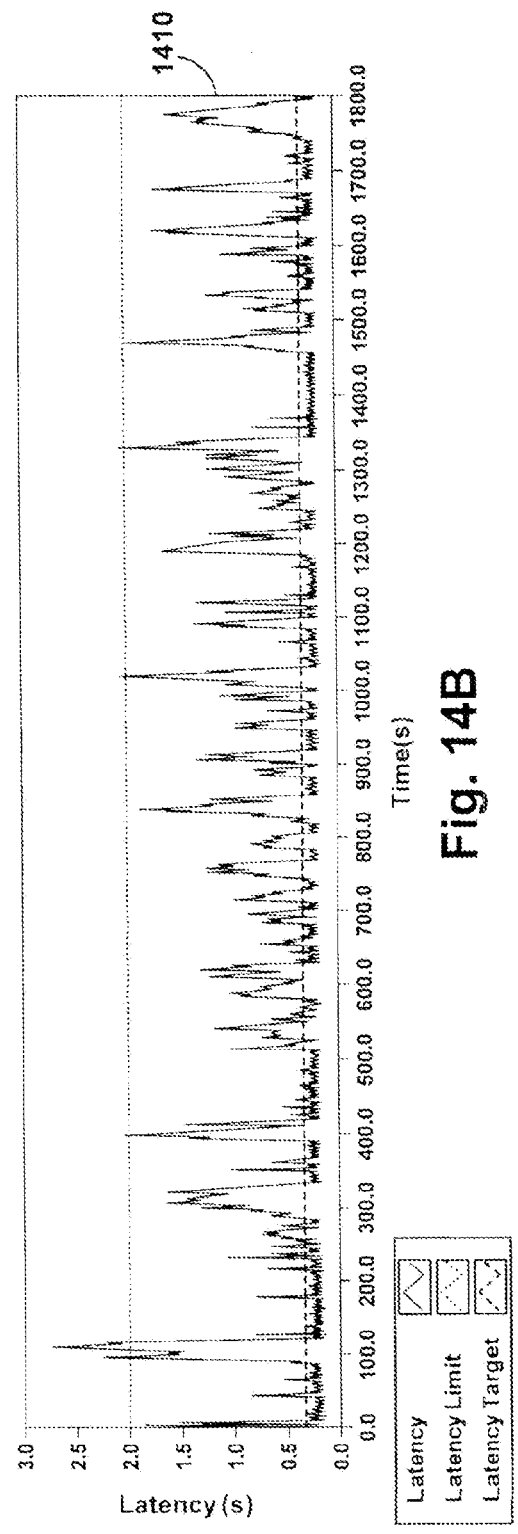

The adaptive control policy was also run on an uncontrolled wireless network and the results from this test are shown on the plots 1405, 1410 in FIGS. 14A-14B. In this test the system throughput was initially set to 0.5 Mbps and the adaptive optimization policy was enabled. The communications network used was a shared wireless network with an undetermined bandwidth which is susceptible to many of the same problems experienced by wireless networks mentioned previously. As such, the results from this test are typical of most shared unlicensed wireless networks.

Due to the highly variable nature of the communications network, the system was not able to settle at a specific throughput for long durations, however it was still able to match the network bandwidth relatively closely. Plot 1410 again shows that the latency in the system was also maintained below the latency limit for the majority of the time. The few cases where the latency limit was exceeded again correspond to rapid decreases in network bandwidth.

Using this control policy, the operator would be able to run the system on any given TCP network with known, unknown or highly variable network characteristics with good confidence that the system would be able to adhere to the real-time latency constraints set by the operator while maximizing the data resolution for the communications network being used.

In addition to remote data acquisition, the disclosure has many potential applications in a variety of fields, such as education, business, medicine, machinery, and entertainment.

Figure 15:
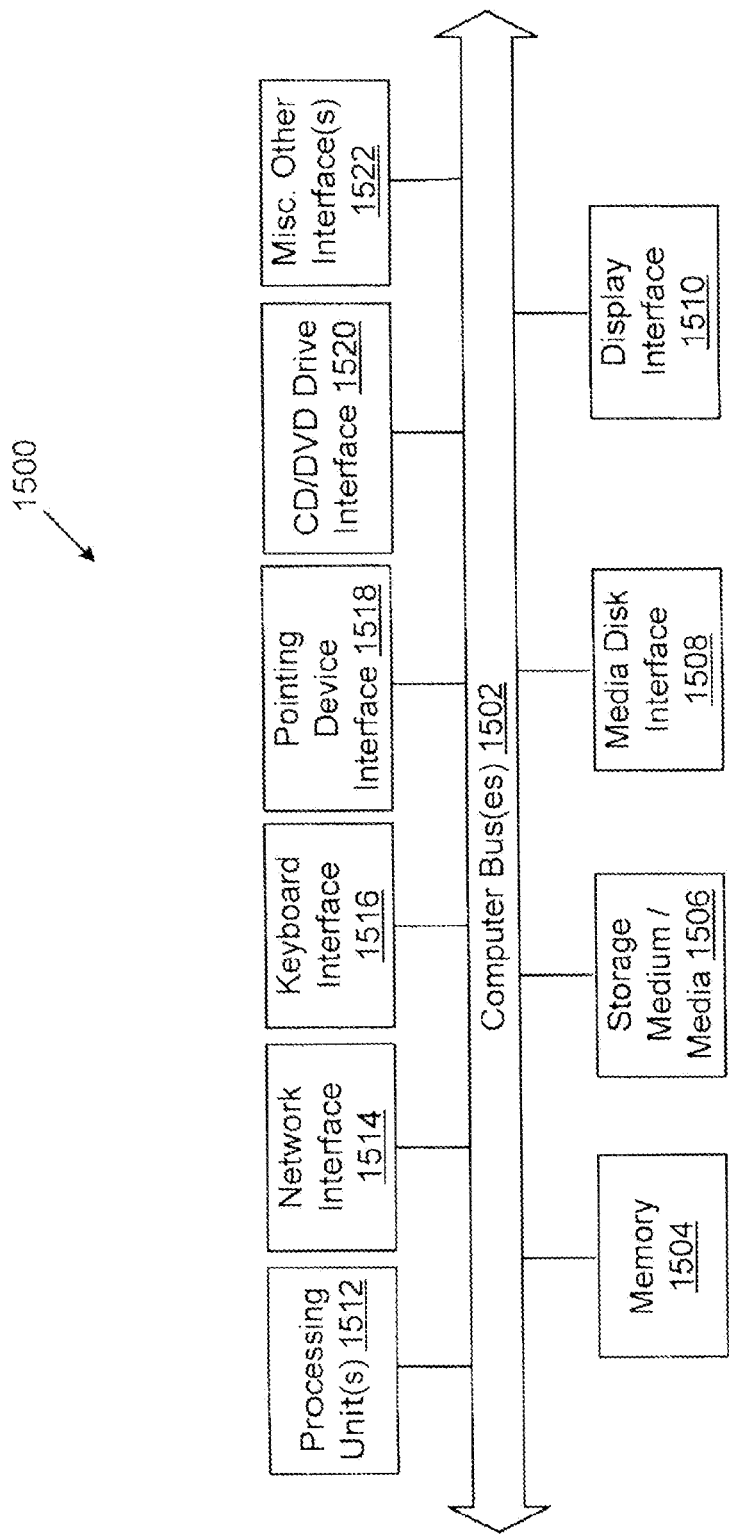
FIG. 15 is a block diagram of a computing device in accordance with an embodiment of the present disclosure.

FIG. 15 is a block diagram illustrating an internal architecture of an example of a computing device, such as remote computing device 105 and/or control computing device 120, in accordance with one or more embodiments of the present disclosure. As shown in FIG. 15, internal architecture 1500 includes one or more processing units (also referred to herein as CPUs) 1512, which interface with at least one computer bus 1502. Also interfacing with computer bus 1502 are persistent storage medium/media 1506, network interface 1514, memory 1504, e.g., random access memory (RAM), run-time transient memory, read only memory (ROM), etc., media disk drive interface 1508 as an interface for a drive that can read and/or write to media including removable media such as floppy, CD-ROM, DVD, etc. media, display interface 1510 as interface for a monitor or other display device, keyboard interface 1516 as interface for a keyboard, pointing device interface 1518 as an interface for a mouse or other pointing device, and miscellaneous other interfaces not shown individually, such as parallel and serial port interfaces, a universal serial bus (USB) interface, and the like.

Memory 1504 interfaces with computer bus 1502 so as to provide information stored in memory 1504 to CPU 1512 during execution of software programs such as an operating system, application programs, device drivers, and software modules that comprise program code, and/or computer-executable process steps, incorporating functionality described herein, e.g., one or more of process flows described herein. CPU 1512 first loads computer-executable process steps from storage, e.g., memory 1504, storage medium/media 1506, removable media drive, and/or other storage device. CPU 1512 can then execute the stored process steps in order to execute the loaded computer-executable process steps. Stored data, e.g., data stored by a storage device, can be accessed by CPU 1512 during the execution of computer-executable process steps.

Persistent storage medium/media 1506 is a computer readable storage medium(s) that can be applied to store software and data, e.g., an operating system and one or more application programs. Persistent storage medium/media 1506 can also be used to store device drivers, such as one or more of a digital camera driver, monitor driver, printer driver, scanner driver, or other device drivers, web pages, content files, and other files. Persistent storage medium/media 1506 can further include program modules and data files used to implement one or more embodiments of the present disclosure.

For the purposes of this disclosure a computer readable storage medium stores computer data, which data can include computer program code executable by a computer, in machine readable form. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method of communication between a remote computing device and a control computing device over a communications network with an unknown and variable bandwidth, said method comprising the steps of:

acquiring, by the remote computing device, raw sensor data from a sensor in communication with the remote computing device, said raw sensor data having a resolution;

adaptively adjusting said resolution of said raw sensor data to generate sensor data, said resolution being adjusted based on the bandwidth of the communications network; and transmitting said sensor data to the control computing device over the communications network.

2. The method of claim 1, further comprising the step of receiving, by the remote computing device from the control computing device, control commands associated with said resolution and throughput of the communications network.

3. The method of claim 2, wherein said adaptively adjusting the resolution of said raw sensor data further comprises the step of adjusting said resolution based on said control commands before transmitting said sensor data to the control computing device.

4. The method of claim 2, wherein said control commands are manually configured to adjust said resolution of said raw sensor data to be less than or equal to the bandwidth.

5. The method of claim 2, wherein said control commands define a maximum latency limit and a minimum resolution limit, said resolution being adjusted to said minimum resolution limit when latency reaches or exceeds said maximum latency limit.

6. The method of claim 2, wherein said control commands define a target latency and a desired resolution, said resolution being adjusted to said desired resolution when latency returns to or falls below said target latency.

7. The method of claim 1, further comprising the step of adjusting said resolution dynamically in real-time based on data latency and the bandwidth of the communications network.

8. The method of claim 1, wherein said adaptively adjusting said resolution of said raw sensor data further comprises the step of reducing said resolution using a mean reduction technique, the mean reduction technique comprising calculating the mean value of a bin of data measurements of said raw sensor data and assigning said mean value as the single measurement for said bin.

9. The method of claim 1, wherein said adaptively adjusting said resolution of said raw sensor data further comprises the step of reducing said resolution using a maximum reduction technique, said maximum reduction technique comprising selecting the maximum value of a bin of data measurements of said raw sensor data and assigning said maximum value as the single measurement for said bin.

10. The method of claim 1, wherein said adaptively adjusting said resolution of said raw sensor data further comprises the step of reducing said resolution using a minimum reduction technique, said minimum reduction technique comprising selecting the minimum value of a bin of data measurements of said raw sensor data and assigning the minimum value as the single measurement for said bin.

11. A remote computing device in communication with a control computing device over a communications network with unknown and variable bandwidth, the remote computing device comprising:

a data acquisition module executed by the remote computing device and configured to acquire raw sensor data from a sensor, said raw sensor data having a resolution;

a data analysis module executed by the remote computing device and configured to analyze said raw sensor data to produce preprocessed sensor data;

a data reduction module executed by the remote computing device and configured to adaptively reduce said resolution of said preprocessed sensor data according to control commands from the control computing device; and a data transmission module executed by the remote computing device and configured to transmit said reduced resolution sensor data over the communications network to the control computing device and configured to receive control commands over the communications network from the control computing device.

12. The remote computing device of claim 11, wherein said data transmission module is further configured to receive control commands from the control computing device, said control commands associated with said reduction of said resolution of said preprocessed sensor data and associated with the bandwidth of the communications network.

13. The remote computing device of claim 11, wherein said data reduction module is further configured to dynamically adjust said resolution associated with said raw sensor data based on the bandwidth of the communications network.

14. The remote computing device of claim 11, wherein said data reduction module is configured to adaptively reduce said resolution by using a mean reduction technique, the mean reduction technique comprising calculating the mean value of a bin of data measurements of said raw sensor data and assigning said mean value as the single measurement for said bin.

15. The remote computing device of claim 11, wherein said data reduction module is configured to adaptively reduce said resolution by using a maximum reduction technique, the maximum reduction technique comprising selecting the maximum value of a bin of data measurements of said sensor data and assigning said maximum value as the single measurement for said bin.

16. The remote computing device of claim 11, wherein said data reduction module is configured to adaptively reduce said resolution by using a minimum reduction technique, said minimum reduction technique comprising selecting the minimum value of a bin of data measurements of said sensor data and assigning said minimum value as the single measurement for said bin.

17. A control computing device in communication with a remote computing device over a communications network with unknown and variable bandwidth, the control computing device comprising:

a data reception module configured to receive sensor data from the remote computing device over the communications network;

a processor configured to generate control commands associated with resolution of said sensor data and associated with the bandwidth of the communications network; and a data transmission module configured to transmit said control commands to the remote computing device to adjust said resolution of said sensor data.

18. The control computing device of claim 17, wherein said control commands are manually generated to adjust said resolution of said sensor data to be less than or equal to the bandwidth.

19. The control computing device of claim 17, wherein said control commands define a latency limit and a resolution minimum, said resolution being adjusted to said resolution minimum when latency reaches or exceeds said latency limit.

20. The control computing device of claim 17, wherein said control commands define a latency target and desired resolution, said resolution being adjusted to said desired resolution when latency returns to or falls below said latency target.

* * * * *